(12) United States Patent
Nagasawa et al.

(10) Patent No.: US 9,180,902 B2
(45) Date of Patent: Nov. 10, 2015

(54) TELESCOPIC STEERING APPARATUS AND OUTER COLUMN

(71) Applicant: NSK Ltd., Tokyo (JP)

(72) Inventors: Makoto Nagasawa, Maebashi (JP); Suguru Sugishita, Maebashi (JP); Takahiro Maniwa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/404,601

(22) PCT Filed: Apr. 2, 2014

(86) PCT No.: PCT/JP2014/059752
§ 371 (c)(1),
(2) Date: Nov. 28, 2014

(87) PCT Pub. No.: WO2014/163112
PCT Pub. Date: Oct. 9, 2014

(65) Prior Publication Data
US 2015/0107398 A1   Apr. 23, 2015

(30) Foreign Application Priority Data

Apr. 3, 2013   (JP) ................. 2013-077791
Nov. 28, 2013   (JP) ................. 2013-246051

(51) Int. Cl.
*B62D 1/185*   (2006.01)
*B60R 25/021*   (2013.01)
(Continued)

(52) U.S. Cl.
CPC ............... *B62D 1/185* (2013.01); *B22D 17/00* (2013.01); *B22D 19/045* (2013.01); *B22D 19/16* (2013.01); *B60R 25/021* (2013.01); *B62D 1/184* (2013.01)

(58) Field of Classification Search
CPC ........ B62D 1/185; B62D 1/184; B62D 19/16; B22D 17/00; B22D 19/045; B60R 25/021
USPC .......................................................... 74/493
See application file for complete search history.

(56) References Cited

U.S. PATENT DOCUMENTS 8,991,861 B1 * 3/2015 Iwakawa et al. .............. 280/775
2010/0000366 A1   1/2010 Nomura et al.
(Continued)

FOREIGN PATENT DOCUMENTS

JP   2007-223383   9/2007
JP   2008-265646 A   11/2008
(Continued)

*Primary Examiner* — Karen Beck
(74) *Attorney, Agent, or Firm* — Miles & Stockbridge P.C.

(57) ABSTRACT

Construction of an outer column for a telescopic steering apparatus is achieved in which sufficient strength is maintained even when a steering lock apparatus is assembled, and smooth operation is maintained when making it possible to adjust the forward/backward position of a steering wheel, and when maintaining the adjusted position. Of the end sections 58a, 58b, 59a, 59b of the sub slit sections 52a, 52b of an approximately H-shaped slit 19a for expanding or contracting the inner diameter of a fitting support portion 31a of an outer column 11b, the rigidity of the nearest end section 58a portion that exists in the location closest to a lock through hole 37a and of the furthest end section 59a portion that exists in a location diagonally from the nearest end section 58a, is greater than the rigidity of the end sections 58b, 59b in the remaining two locations. Moreover, convex sections 61a, 61b are provided at two locations in the up/down direction on the outside surfaces of each of a pair of held plate sections 20a, 20b.

9 Claims, 19 Drawing Sheets

(51) Int. Cl.
*B62D 1/184* (2006.01)
*B22D 17/00* (2006.01)
*B22D 19/04* (2006.01)
*B22D 19/16* (2006.01)

(56) References Cited

U.S. PATENT DOCUMENTS

2010/0219624 A1* 9/2010 Matsuno .................. 280/779
2011/0204610 A1 8/2011 Kwon
2014/0150596 A1 6/2014 Nagasawa
2015/0107398 A1* 4/2015 Nagasawa et al. ............ 74/493
2015/0107399 A1* 4/2015 Nagasawa et al. ............ 74/493
2015/0122075 A1* 5/2015 Mihara et al. ................. 74/493

FOREIGN PATENT DOCUMENTS

| JP | 2009-006847 A | 1/2009 |
| JP | 2009-202636 A | 9/2009 |
| WO | WO 2006/011378 A1 | 2/2006 |
| WO | WO 2013/015254 A1 | 1/2013 |

* cited by examiner

TELESCOPIC STEERING APPARATUS AND OUTER COLUMN

TECHNICAL FIELD

The present invention relates to a telescopic steering apparatus that allows adjustment of the forward/backward position of a steering wheel, and to an outer column that is used in that telescopic steering apparatus.

BACKGROUND ART

A steering apparatus such as illustrated in FIG. 18 has been widely used in order to apply a steering angle to the steered wheels (normally the front wheels) of an automobile. In this steering apparatus, a steering shaft 3 is supported so as to be able to rotate on the inner-diameter side of a cylindrical steering column 2 that is supported by the vehicle body 1. A steering wheel 4 is fastened to the rear-end portion of the steering shaft 3 that protrudes further toward the rear than the rear-end opening of the steering column 2. The rotation of the steering wheel 4 is transmitted to an input shaft 8 of a steering gear unit 7 by way of a universal joint 5a, an intermediate shaft 6 and a universal joint 5b. The rotation of the input shaft 8 pushes or pulls a pair of tie rods 9 that are located on both sides of the steering gear unit 7, which applies a steering angle to the steered wheels that corresponds to the amount that the steering wheel 4 was operated.

The steering apparatus may comprise a telescopic mechanism for adjusting the forward/backward position of the steering wheel 4 according to the size and driving posture of the operator. In the telescopic mechanism, the steering column 2 is constructed such that the rear-end section of a front-side inner column 10 fits inside the front-end section of an outer column 11 so that relative displacement in the axial direction is possible, and such that the entire length is able to extend or contract in a telescopic shape, and the steering shaft 3 is constructed such that an outer tube 12 is combined with an inner shaft 13 with a spline joint or the like so that torque can be transmitted and so as to be able to freely extend and contract. In the example in FIG. 18, a tilt mechanism is also assembled in order to adjust the up/down position of the steering wheel 4. Furthermore, an electric-powered power steering apparatus having an electric motor 14 as an auxiliary power source is also assembled, and this electric-powered power steering apparatus makes it possible to reduce the force required for operating the steering wheel 4. More specifically, a housing 15 that houses a worm reduction gear or the like is connected and fastened to the front-end section of the steering column 2, and this housing 15 is supported by the vehicle body 1 so as to be able to pivotally displace around a horizontal shaft 16. Moreover, a column-side bracket 18 that is fastened to part of the steering column 2 is supported by a support bracket 17, which is supported by a different location of the vehicle body 1, and is supported so as to be able to displace in the forward/backward direction and up/down direction.

Except for electric powered devices, in the tilt mechanism and telescopic mechanism, it is necessary, based on the operation of an adjustment lever, to be able to switch between a state in which the position of the steering wheel 4 can be adjusted, and a state in which the adjusted position can be maintained. Therefore, as illustrated in FIG. 19, a slit 19 that extends in the axial direction is provided on the bottom surface of a portion near the front-end section and middle of the outer column 11, and this slit 19 makes it possible for the inner diameter of the front-end section of the outer column 11 to expand or contract. A pair of held plate sections 20 is provided in portions on both sides in the width direction of the slit 19. Long holes 21 in the forward/backward direction that extend in the axial direction of the outer column 11 are formed in portions of the pair of held plate sections 20 that are aligned with each other. Moreover, long holes 23 in the up/down direction that are partially arc shaped centered around the horizontal shaft 16 are formed in a pair of support plate sections 21 that are parallel with each other and that hold the held plate sections 20 on both sides in the width direction. An adjustment rod 24 is inserted through the long holes 21 in the forward/backward direction and the long holes 23 in the up down direction. A head section 25 that is provided on the base-end section of the adjustment rod 24 engages with the long hole 23 in the up/down direction that is formed in one (right side in FIG. 19) of the support plate sections 22 so that displacement is only possible along the long holes 23 in the up/down direction, or in other words, in a state so that rotation is prevented. On the other hand, a cam apparatus 29 that comprises a drive-side cam 27 and a driven-side cam 28 is provided between a nut 26 that is screwed onto the tip-end section of the adjustment rod 24 and the outside surface of the other (left side in FIG. 19) support plate section 22. The drive-side cam 27 is rotated and driven by an adjustment lever 30. By providing a thrust bearing 53 between the outside surface of the adjustment lever 30 and the nut 26, the operational feeling when operating the adjustment lever 30 is improved.

When adjusting the position of the steering wheel 4, the adjustment lever 30 is rotated in a specified direction, which rotates and drives the drive-side cam 27 and reduces the dimension in the axial direction of the cam apparatus 29. As a result, the space between the inside surfaces that face each other of the driven-side cam 28 and the head section 25 is increased, and the force that the support plate sections 22 apply to the held place sections 20 is released. As the same time, the inner diameter of the portion of the front section of the outer column 11 where the rear section of the inner column 10 fits is elastically expanded, and the pressure acting on the area of contact between the inner-circumferential surface of the front section of the outer column 11 and the outer-circumferential surface of the rear section of the inner column 10 decreases. In this state, adjustment of the up/down position and the forward/backward position of the steering wheel 4 is possible within the range that the adjustment rod 24 is able to displace inside the long holes 21 in the forward/backward direction and the long holes 23 in the up/down direction.

After the steering wheel 4 has been moved to a desired position, the adjustment lever 30 is rotated in a direction opposite the specified direction, which increases the dimension in the axial direction of the cam apparatus 29. As a result, the space between the inside surfaces that face each other of the driven-side cam 28 and the head section 25 is reduced, and the held plate sections 20 are firmly pressed by the support plate sections 22. At the same time, the inner diameter of the portion on the front section of the outer column 11 where the rear section of the inner column 10 fits is elastically reduced, and the surface pressure that acts on the area of contact between the inner-circumferential surface of the front section of the outer column 11 and the outer-circumferential surface of the rear section of the inner column 10 increases. As a result, the up/down position and forward/backward position of the steering wheel is maintained in the adjusted position.

In recent years, as a countermeasure against automobile theft, various kinds of anti-theft apparatuses have been provided in automobiles. One kind of such an apparatus that is widely used is a steering lock apparatus that makes operation of the steering wheel impossible unless a proper key is used. FIG. 20 illustrates an example of a steering lock apparatus as disclosed in JP 2008-265646 (A). The steering lock apparatus 32 has a lock unit 33 that is provided on part of the steering column 2a and a key-lock collar 35 that is fitted around and fastened to the outside of part of the steering shaft 3a in a position that coincides with the phase in the axial direction of the lock unit 33 and is provided with an engaging concave section 34 that is formed in at least one location in the circumferential direction of this key-lock collar 35. During operation (when the key is locked), the tip-end section of a lock pin 36 of the lock unit 33 is displaced toward the inner-diameter side of the steering column 2a through a lock hole 37 that is formed in the middle section in the axial direction of the steering column 2a, and by engaging with the engaging concave section 34, rotation of the steering shaft 3a becomes practically impossible. In other words, when an attempt is made to rotate the steering wheel 4 with a force that exceeds a specified value (value regulated by key lock regulation) when the ignition is OFF and the engaging concave section 34 and lock pin 36 are engaged, the steering shaft 3a rotates with respect to the key-lock collar 35. However, the steering shaft 3a does not rotate when an attempt is made to rotate the steering wheel 4 with a normal operating force.

When assembling the steering lock apparatus 32 in the steering apparatus, the lock unit 33 is provided on the outer-diameter side of the steering column 2a, and the key-lock collar 35 is provided on the inner-diameter side of the steering column 2a. Therefore, in order to place the key-lock collar 35 on the inner-diameter side of the steering column 2a so as to be able to rotate, and to make it possible for the lock pin 36 and key-lock collar 35 to become completely disengaged without increasing the stroke of the lock pin 36, it is necessary to make at least the outer diameter of the portion of the steering column 2a where the steering lock apparatus 32 is assembled small and the inner diameter of this portion large, or in other words, it is necessary to make the thickness of the steering column 2a thin in that portion.

FIG. 21 illustrates an outer column 11a that is disclosed in JP 2007-223383 (A). An outer column 11a is integrally formed by casting using a light alloy such as an aluminum alloy, magnesium alloy or the like. A fitting support portion 31 for the end section of a cylindrical shaped inner column 10 (see FIG. 18) to fit into so that relative displacement is possible in the axial direction is provided on the end section in the axial direction of the outer column 11a, and a lock hole 37a for assembling the steering lock apparatus 32 is provided in the middle section in the axial direction of the outer column 11a. In an outer column 11a having this kind of construction, there is a possibility that the strength required when the steering lock apparatus 32 is operated will not be sufficiently maintained. In other words, when an attempt is made to rotate the steering wheel 4 with a large force when the lock pin 36 that protrudes toward the inner-diameter side of the outer column 11a through the lock hole 37a is engaged with the engaging concave section 34 of the key-lock collar 35, there is a possibility that the lock hole 37a will deform due to an excessively large force. Therefore, in order to prevent this kind of deformation, it is necessary to sufficiently maintain the strength of the outer column 11a. In order for that, increasing the wall thickness of the outer column 11a, or making the outer column 11a using an iron-based material is possible, however, in that case, a problem occurs in that the overall weight of the steering column increases.

RELATED LITERATURE

Patent Literature

[Patent Literature 1] JP 2008-265646 (A)
[Patent Literature 2] JP 2007-223383 (A)

SUMMARY OF INVENTION

Problem to be Solved by Invention

In consideration of the situation described above, the object of the present invention is to provide an outer column for a telescopic steering apparatus for which sufficient strength is maintained even when an anti-theft key-lock system is assembled, and that allows for smooth operation when making it possible to adjust the forward/backward position of the steering wheel, and when maintaining the steering wheel in the adjusted position.

Means for Solving Problems

The outer column for a telescopic steering apparatus of the present invention has:
a slit that is formed in one end section in the axial direction that makes it possible to expand or contract the inner diameter of the outer column;
a pair of held plate sections that are provided at positions on both sides of the slit in the width direction of the outer column; and
a lock through hole that is formed in a portion that is separated in the axial direction from the pair of held plate sections, with the phase in the circumferential direction thereof being shifted from the center axis of the slit. Moreover, long holes that extend in the axial direction are formed in portions of the pair of held plate sections that are aligned with each other.

Particularly, in the outer column for a telescopic steering apparatus of the present invention, the slit has an approximately H shape as seen from the radial direction, and has: a main slit section that is formed in the axial direction; and a pair of sub slit sections that are formed in the circumferential direction on both end sections in the axial direction of the main slit section, with the middle sections in the circumferential direction thereof being continuous with the end sections in the axial direction of the main slit section. The lengths in the circumferential direction from the main slit, of the nearest end section that is one of two end sections of one sub slit section of the pair of sub slit sections on the side in the axial direction near the lock through hole and that exists in a position in the circumferential direction near the lock through hole, and of the furthest end section that is one of two end sections of another sub slit section on the far side in the axial direction from the lock through hole and that exists in a position that is located diagonally from the nearest end section and that is separated the most from the lock through hole, are shorter than the lengths in the circumferential direction from the main slit section, of another end section of the one sub slit section, and of another end section of the other sub slit section. With this construction, the rigidities in the direction of expansion or contraction of the width of the slit of portions where the nearest end section and the furthest end section are formed are greater than the rigidities in the direction of expansion or contraction of the width of the slit of portions where the other end section of the one sub slit section and the other end section of the other sub slit section are formed.

Moreover, convex sections that protrude outward in the width direction and extend in the axial direction are provided at two locations on the outside surfaces of the pair of held plate sections that are separated in the up/down direction in a state that the outer column is mounted to a vehicle body. A support section that protrudes outward in the width direction is provided in a portion between the convex sections in the up/down direction of the end section on the far side in the axial direction from the lock through hole of one of the outside surfaces of the pair of held plate sections that is on the far side in the circumferential direction from the lock through hole.

Preferably, the length in the circumferential direction of the nearest end section is regulated so that the nearest end section is not located in the portion between the one held plate section of the pair of held plate sections that is provided on the near side in the circumferential direction to the lock through hole and the lock through hole, or in other words, is regulated so that the one held plate section, the lock through hole and the nearest end section do not overlap in the axial direction.

Preferably, the convex sections are provided on the top-end section and bottom-end section of the pair of held plate sections. Moreover, preferably, an inclined surface is provided on at least the end section of the support section on the side in the axial direction near the lock through hole so that the height of the support section gradually becomes lower going in the axial direction toward the lock through hole. Furthermore, preferably, in one of the outside surfaces of the pair of held plate sections that is on the near side in the circumferential direction to the lock through hole, one of the convex sections that is provided on the top protrudes further outward in the width direction than other of the convex sections that is provided on the bottom side. In addition, it is also further preferred that a reinforcing rib be provided on the outer-circumferential surface of the portion that surrounds the nearest end section.

Moreover, preferably the outer column of the present invention is constructed by joining: a main part, which is made of a light metal alloy and that has an end section; and a cylindrical shaped member, which is made of an iron-based material and that has a middle section in the axial direction and an end section, the inner diameter dimension of the end section of the cylindrical shaped member being smaller than that of the middle section in the axial direction, in the axial direction by fitting and fastening the end section of the cylindrical shaped member inside the end section of the main part. The slit and pair of held plate sections are provided on the main part, and the lock through hole is provided on the cylindrical shaped member.

The telescopic steering apparatus in which the outer column of the present invention is assembled has; a steering column, a steering shaft, a support bracket, a rod shaped member and adjustment means. The steering column has an inner column and an outer column that is fitted around the outside of the end section of the inner column, with the diameter of the end section thereof being able to expand or contract by way of a slit that is provided in the end section that is a fitting section that fits with the inner column. The steering shaft is constructed by combining together an outer tube and an inner shaft so that the entire length is able to extend or contract, and that is rotatably supported on the inner-diameter side of the steering column, and the rear-end section thereof protrudes further toward the rear than the rear-end section of the steering column. The support bracket has a pair of support plate sections that hold the pair of held plate sections from both sides in the width direction, and an installation plate section that supports the pair of support plate sections with respect to the vehicle body. Bracket-side through holes are formed in portions of the pair of support plate sections that are aligned with the long holes that are formed in the pair of held plate sections. The rod shaped member is inserted though the long holes and the bracket-side through holes. The adjustment means expands or contracts the space between a pair of pressure sections that are provided on both end sections of the rod shaped member by the operation of an adjustment lever that is provided on the end section of the rod shaped member. When contracting that space, the adjustment means secures the forward/backward position of the outer column with respect to the inner column by reducing the space between the inside surfaces of the pair of support plate sections, and causing friction engagement between the inside surfaces of the pair of support plate sections and the outside surfaces of the pair of held plate sections.

In the telescopic steering apparatus of the present invention, the outer column of the present invention is used as the outer column. Preferably, the support rigidity (bending rigidity in the width direction) with respect to the installation plate section of one support plate section of the pair of support plate sections that is separated in the width direction from the lock through hole is higher than the support rigidity with respect to the installation plate section of the other support plate section. In order for this, for example, a reinforcing plate is provided between the support plate section of the pair of support plate sections that is furthest in the width direction from the lock through hole and the installation plate section.

Effect of Invention

According to the present invention, both maintenance of strength and rigidity and maintenance of flexibility of the outer column for a telescopic steering apparatus can be achieved at a higher degree. Therefore, when the steering wheel is rotated with the steering lock apparatus in the operated state, stress that occurs in the fitting support portion of the outer column which the inner column is fitted into and supported by can be reduced, and the force required for expanding or contracting the inner diameter of this fitting support portion can be kept small. As a result, in construction in which a steering lock apparatus is provided, smooth operation of the work of expanding or contracting the inner diameter of the fitting support portion for making possible forward/backward adjustment of the steering wheel and maintaining the forward/backward position after adjustment is sufficiently maintained while at the same time durability of the outer column is sufficiently maintained, so it is possible to improve the operational feel of operating the adjustment lever.

Moreover, with the telescopic steering apparatus of the present invention, the support rigidity of one of the support plate sections of the support bracket is increased, so when the steering wheel is rotated with the steering lock apparatus in the operated state, the entire steering column is effectively prevented from rotating. The inside surface of the one support plate section having high support rigidity can come in contact with a pair of convex sections and a support section that are provided on the outside surface of the held plate section of the outer column that is on the far side in the circumferential direction from the lock through hole. Therefore, even when the adjustment lever is operated with the rod shaped member located near the front end of the long holes, the one support plate section is prevented from bending and deforming in the up/down direction between the pair of convex sections. Consequently, the tightening force as a result of operating the adjustment lever is prevented from being consumed in bending and deforming the one support plate section. As a result, when the rod shaped member is located near the front end of the long holes, it becomes possible to sufficiently reduce the inner diameter of the fitting support portion, and it is possible to stabilize the operational feel of the adjustment lever in the forward/backward direction of the steering wheel.

MODES FOR CARRYING OUT INVENTION

First Example

FIG. 1 to FIG. 15 illustrate a first example of an embodiment of the present invention. A feature of this example is construction that makes it possible to maintain sufficient strength as well as allows smooth operation when making it possible to adjust the forward/backward position of the steering wheel and maintaining the adjusted position even when an anti-theft key-lock system is assembled. The construction, functions and effects of the other parts, including the construction of the electric-powered power steering apparatus, are the same as in the conventional construction. Therefore, the explanation will center on the feature of this example.

Figure 18:
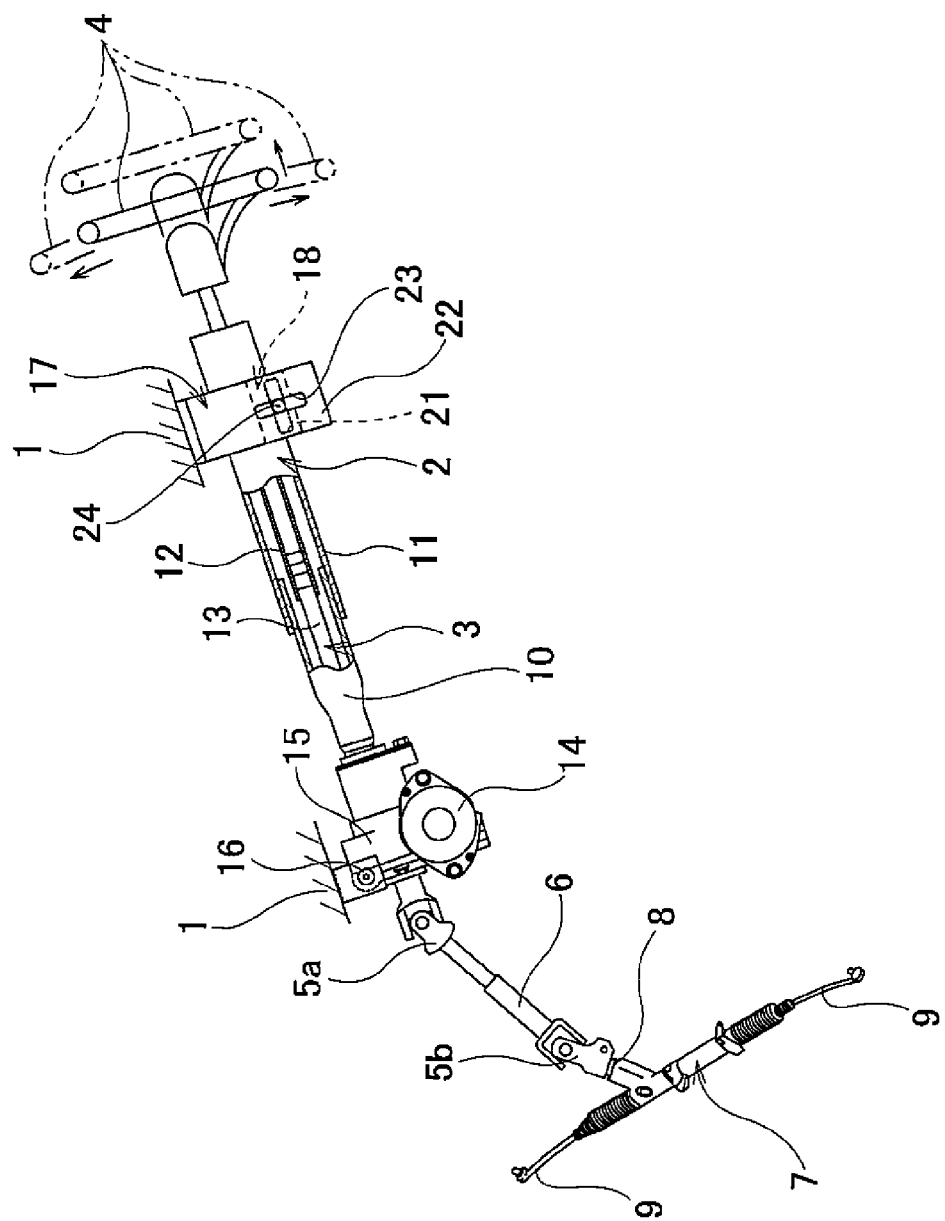
FIG. 18 is a partial enlarged cross-sectional view illustrating an example of a conventional steering apparatus for an automobile.
Figure 19:
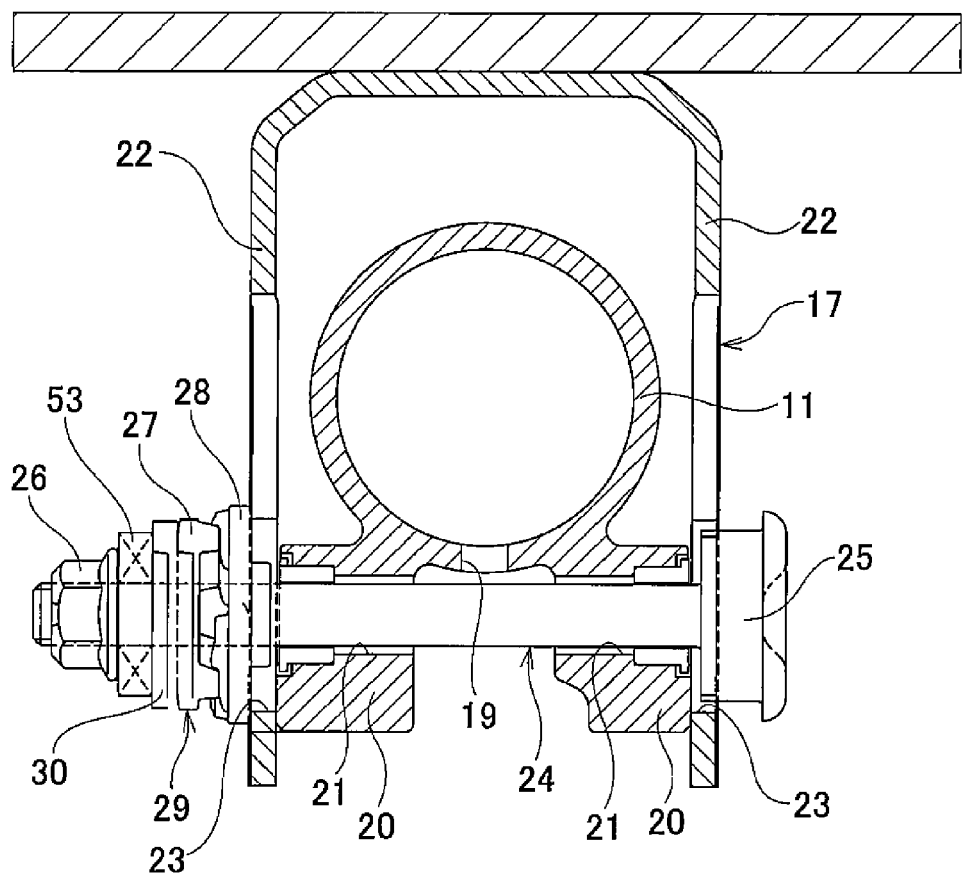
FIG. 19 is a cross-sectional view illustrating an example of conventional steering wheel position adjustment mechanism.

The telescopic steering apparatus of this example has a steering column 2a, a steering shaft 3a, a support bracket 17a, an adjustment rod 24a corresponding to a rod shaped member, and a cam apparatus 29 corresponding to an adjustment means. The steering column 2a has an inner column 10a and an outer column 11b. The steering shaft 3a has an outer tube 12 and an inner shaft 13 that are combined so that the overall length can be extended or contracted, and this steering shaft 3a is supported on the inner-diameter side of the steering column 2a so as to be able to rotate freely, and the rear-end section of the steering shaft 3a protrudes further toward the rear than the rear-end section of the steering column 2a. A steering wheel 4 is supported by and fastened to the rear-end section of the steering shaft 3a (see FIG. 18).

The support bracket 17a is formed by connecting and fastening together an installation plate section 49 and a pair of support plate sections 22a, 22b, each of which were obtained by bending metal plate, by welding or the like. The installation plate section 49 is for supporting and fastening the support bracket 17a with respect to the vehicle body, and is supported by and fastened to the vehicle body side using well known installation construction so that it can be detached toward the front during a secondary collision. The support plate sections 22a, 22b are parallel and separated from each other in the width direction, and are provided so as to hang down in the vertical direction from the bottom surface of the installation plate section 49. Long holes 23a that extend in the up/down direction and that correspond to bracket-side through holes are formed in positions of the support plate sections 22a, 22b that are aligned with each other. In the case where a tilt mechanism is omitted, the bracket-side through holes can be constructed just by simple circular holes. Reinforcing plates 50a, 50b are provided so as to span between the outside surface of both end sections in the forward/backward direction of one of the support plate sections 22a of the support plate sections 22a, 22b (left side in FIG. 1, top side in FIG. 2) and the bottom surface of part of the installation plate section 49 that protrudes further outward in the width direction than the one support plate section 22a. The reinforcing plates 50a, 50b are integrally provided with the support plate section 22a and formed by bending both end sections in the forward/backward direction of the support plate section 22a at right angles toward the outside in the width direction.

The outer column 11b of this example is constructed by joining together in the axial direction a main part 38a that is made of a light metal alloy such as an aluminum alloy or magnesium alloy, and a cylindrical-shaped member 39 that is made using an iron-based material such as carbon steel. More specifically, as illustrated in FIG. 8A, the inner-diameter dimension of the front-end surface of the cylindrical shaped member 39 is made to be less than the inner-diameter dimension of the portion of the cylindrical shaped member 39 that is located on the inner-diameter side of the portion where the rear-end surface of the main part 38 is formed (end surface on the rear side in the forward/backward direction of the vehicle when assembled in the vehicle, right-end surface in FIG. 8A) by performing a drawing process on the front-end section (end section on the front side in the forward/backward direction of the vehicle when assembled in the vehicle) of the cylindrical shaped member 39. Moreover, concave sections 40 are formed in plural locations (four locations in the example in the figure) in the circumferential direction of the outer-circumferential surface of the front-end section of the cylindrical shaped member 39 by pressing. Then as illustrated in FIG. 8A, the portion near the front end of the cylindrical shaped member 39 is inserted through an insertion hole 43 that is formed in the end surface 42 of a die 41 and caused to protrude inside the die 41.

The tip-end section 45 of the core 44 is inserted into the inner-diameter side of the front-end section of the cylindrical shaped member 39, and a stepped surface 47 that is provided between the tip-end section 45 and the base-end section 46 of the core 44 comes in contact with the front-end surface of the cylindrical shaped member 39. In this state, the main part 38 is formed by feeding the molten metal of the aluminum alloy, magnesium alloy or the like into the die 41. By forcing part of the molten metal into the concave sections 40 of the cylindrical shaped member 39, convex sections 48 are formed on the inner-circumferential surface of the rear-end section of the main part 38. After being removed from the die 41 as illustrated in FIG. 8B, machining is performed on inner-circumferential edge of the front-end section of the cylindrical shaped member 39 that protrudes further inward in the radial direction than the inner-circumferential surface of the main part 38 as illustrated in FIG. 8C, and the inner diameter of at least the portion near the front end of the cylindrical shaped member 39 is made to be equal to or greater than the inner diameter of the part of the main part 38 that is separated in the axial direction from the fitting portion that fits with the cylindrical shaped member 39. Thereafter, machining is also performed as needed on the portion near the rear end of the inner-circumferential surface of the main part 38 so that there are not any stepped surfaces facing the forward direction between the inner-circumferential surface of the main part 38 and the front-end edge of the of the cylindrical shaped member 39 where the inner column 10a is inserted that could hinder smooth displacement in the forward direction of the outer column 11b during a secondary collision. The diameter of the inscribed circle of the protrusions that exist in the portion on the inner-circumferential surface of the front-end section of the cylindrical shaped member 39 that corresponds to the concave sections 40 is equal to or greater than the inner diameter of the main part 38 that is separated in the axial direction from the fitting portion that fits with the cylindrical shaped member 39, and the tip end of these protrusions do not protrude further inward in the radial direction than the inner-circumferential surface of the non-fitting portion of the main part 38.

In the outer column 11b of this example, the portion near the rear end is the cylindrical shaped member 39 that is made using an iron-based material that can easily maintain strength, so it is possible to maintain the overall strength of the outer column 11b even when the thickness of a portion for installing a lock unit 33 (see FIG. 20) or key-lock collar 35 is made thin, or when a lock through hole 37 is provided in order to insert a lock pin 36. Moreover, the concave sections 40 that are formed around the outer-circumferential surface on the front-end section of the cylindrical shaped member 39 and the convex sections 48 that are formed around the inner-circumferential surface of the rear-end section of the main part 38 fit together, so the joint strength in the axial direction between the main part 38 and the cylindrical shaped member 39 is sufficiently maintained. Furthermore, even when an attempt is made to rotate the steering wheel 4 with a large force when the lock pin 36 is engaged with the engaging concave section 34 of the key-lock collar 35, high torsional rigidity is maintained by the engagement of the concave sections 40 and convex sections 48 in the joint section between the main part 38 and the cylindrical shaped member 39.

In this example as well, due to the necessity to keep the surface pressure at the area of contact between the inner-circumferential surface of the outer column 11b and the outer-circumferential surface of the inner column 10a sufficiently high as the adjustment lever 30a is operated, a slit 19a is provided in the front-end section of the outer column 11b, which corresponds to the fitting section that is fitted around the end section of the inner column 10a, in order to make it possible for the outer column 11b (fitting support portion 31a) to expand or contract in the radial direction. In this example, the slit 19a is provided in the main part 38a. Furthermore, in this example, the slit 19a has an approximately H shape as seen in the radial direction. More specifically, the slit 19a has a main slit section 51 and a pair of sub slit sections 52a, 52b. The main slit section 51 is formed in the axial direction of the outer column 11b (parallel to the center axis) and is provided in the center of the portion between the pair of held plate sections 20a, 20b of the outer column 22b. The sub slit sections 52a, 52b are formed in the circumferential direction on both end sections in the forward/backward direction of the main slit section 51, and the end sections in the forward/backward direction of the main slit section 51 are connected to the middle sections in the circumferential direction of the sub slit sections 52a, 52b. In consideration that there is a possibility that there will be insufficient strength due to leaking of molten metal when die casting the main part 38a or due to insufficient fitting length when the rear-end edge of the sub slit 52a that is provided on the rear side (right side in FIG. 2 to FIG. 6 and FIG. 13), which is the side in the axial direction that is close to the lock through hole 37b, overlaps the cylindrical shaped portion 39 in the radial direction, this rear-end edge is regulated to be located in a position so as not to overlap the cylindrical shaped member 39 in the radial direction. In other words, the rear-end edge of the sub slit section 52a is located further forward than the front-end surface of the cylindrical shaped member 39.

The pair of held plate sections 20a, 20b are provided parallel with each other at positions on the outer-circumferential surface of the main part 38a that surround the slit 19a on both sides in the width direction, and are integrally formed with the main part 28. Moreover, long holes 21a, 21b in the forward/backward direction that extend in the axial direction of the outer column 11b are formed in portions of the held plate sections 20a, 20b that are aligned with each other. An adjustment rod 24a is inserted through the long holes 21a, 21b in the forward/backward direction, and the pair of long holes 23a in the up/down direction that are formed in the pair of support plate sections 22a, 22b. A washer 54 and a thrust bearing 55 are fitted in that order from the portion near the center of the adjustment rod 24 around the portion of the middle section of the adjustment rod 24a near the tip-end side (portion near the right side in FIG. 1). A nut that is screwed onto the tip-end section of the adjustment rod 24a prevents the washer 54 and thrust bearing 55 from coming off from the adjustment rod 24a. After being screwed to the necessary location, the nut 56 is prevented from becoming loose by crimping and deforming some portions. The washer 54 and thrust bearing 55 are provided so that displacement of the adjustment rod 24a and displacement of the tip-end section of the adjustment rod 24a along the long hole 23a in the up/down direction when adjusting the position of the steering wheel 4 (see FIG. 18 and FIG. 20) can be performed smoothly. On the other hand, a cam apparatus 29 that is provided on the base-end section of the adjustment rod 24a has a drive-side cam 27 and a driven-side cam 28. In this example, the washer 54 and the driven-side cam 28 correspond to a pair of pressure sections.

Installation sections 57 for fastening a harness and column cover are provided on both end sections in the forward/backward direction of the outer-circumferential surface of the main part 38a so as to protrude in a downward direction, and have screw holes that are formed in the tip-end surfaces thereof. In this example, the installation sections 57 are provided in the portions on both sides in the forward/backward direction of the held plate section 20a of the held plate sections 20a, 20b that is provided on the side farther in the circumferential direction from the lock through hole 37b.

On the other hand, a rectangular shaped lock through hole 37b that communicates the inner-circumferential surface and outer-circumferential surface of the cylindrical shaped member 39 is formed in part of the cylindrical shaped member 39. When the cylindrical shaped member 39 and main part 38a are connected and fastened together, the lock through hole 37b is located in a portion that is separated in the axial direction from the held plate sections 20a, 20b, and in a portion where the phase in the circumferential direction is separated from the slit 19a (main slit section 51 and sub slit section 52a on the rear side). In this example, the lock through hole 37a is located in a range where the shift of the phase from the center axis of the slit 19a (main slit section 51) is 90 degrees or less (approximately 45 degrees in the example in the figure).

In this example, of the two slit end sections 58a, 58b, which are both end sections of the sub slit section 52a on the rear side, the length in the circumferential direction from the main slit section 51 of the nearest end section 58a that exists in the portion near the lock through hole 37b in the circumferential direction is shorter than the length in the circumferential direction from the main slit section 51 of the remaining slit end section 58b. More specifically, the length in the circumferential direction of the nearest end section 58a is regulated so that the nearest end section 58a does not overlap the portion between the other held plate section 20b of the held plate sections 20a, 20b, which is provided on the side nearer to the lock through hole 37b in the circumferential direction, and lock through hole 37b, or in other words, so that the nearest end section 58a does not overlap in the axial direction the other held plate section 20b and the lock through hole 37b. As a result, the rigidity in the direction of expansion or contraction of width of the slit 19a of the portion of the outer column 11b (fitting support portion 31a) where the nearest end section 58a is formed is higher than the rigidity in the direction of expansion or contraction of width of the slit 19a of the portion where the slit end section 58b is formed.

Of the two slit end sections 59a, 59b, which are both end sections of the sub slit section 52b on the front side, the length in the circumferential direction from the main slit section 51 of the furthest end section 59a that exists in the diagonal position with respect to the nearest end section 58a and is separated the most from the lock through hole 37b is shorter than the length in the circumferential direction from the main slit section 51 of the remaining slit end section 59b. As a result, the rigidity in the direction of expansion or contraction of width of the slit 19a of the portion of the outer column 11b (fitting support portion 31a) where the furthest end section 59a is formed is higher than the rigidity in the direction of expansion or contraction of width of the slit 19a of the portion where the slit end section 59b is formed.

A reinforcing rib 60, the thickness of which is greater than the other portions, is formed on the outer-circumferential surface of the fitting support portion 31a in the adjacent portion that surrounds the nearest end section 58a. In this example, the position and size of the reinforcing rib 60 is regulated so that the reinforcing rib 60 is located in (overlaps in the axial direction) the portion between the other held plate section 20b and the lock through hole 37b. Moreover, of the installation sections 57, the installation section on the front side is provided in the portion adjacent to the furthest end section 59a, and the installation section 57 on the rear side is provided further toward the rear than the rear-end edge of the sub slit section 52a on the rear side. By partially forming the reinforcing rib 60 so that the lengths in the circumferential direction of the sub slit sections 52a, 52b differ from each other on both sides in the width direction (left-right) of the main slit section 51 in this way, the rigidity of the fitting support portion 31a of the outer column 11b is adjusted. Furthermore, the installation section 57 on the front side is provided in the portion adjacent to the furthest end section 59a, and the installation section 57 on the rear side is provided further toward the rear than the sub slit section 52a on the rear side, so together with being able to increase the rigidity and strength in the direction of expansion and contraction of the width of the slit 19a in these portions, a useless increase in the rigidity in the direction of expansion and contraction of the width of the slit 19a of the remaining slit end sections 58b, 59b is prevented.

In this example, convex sections 61a, 61b are provided on the top-end section and bottom-end section of the outside surfaces of the held plate sections 20a, 20b so as to protrude outward in the width direction, and so as to extend over the entire length thereof in the axial direction of the outer column 11b. The amounts that the convex sections 61a, 61b protrude from the outside surfaces of the held plate sections 20a, 20b are the same. Therefore, when the held plate sections 20a, 20b are held on both sides in the width direction by the support plate sections 22a, 22b of the support bracket 17a, the inside surfaces of the support plate sections 22a, 2b come in contact with the tip-end surfaces (outside surfaces) of the convex sections 61a, 61b. Furthermore, in this example, a support section 62 that protrudes outward in the width direction and arranged so as to be parallel to the convex sections 61a, 61b is provided in the portion between the convex sections 61a, 61b in the up/down direction and near the front end of the outside surface (right side in FIG. 1) of the one held plate section 20a of the held plate sections 20a, 20b that is provided on the side farther in the circumferential direction from the lock through hole 37b. The amount that the support section 62 protrudes from the outside surface of the one held plate section 20a is the same as or a little less than the amount that the convex sections 61a, 61b protrude. Moreover, an inclined surface 63 is provided on the rear-end section of the support section 62 so that the height of that rear-end section (thickness in the width direction) gradually becomes lower while going toward the rear, and so as to be smoothly continuous from the tip-end surface of the support section 62. On the other hand, sections 64 with material removed are provided in the portion of the outside surface of the one held plate section 20a that is separated in the axial direction from the support section 62 of the portion between the convex sections 61a, 61b (rear-end section from the center section), and in the portion of the other held plate section 20b between the convex sections 61a, 61b. As a result, it is possible to make the rigidity in the direction of expansion or contraction of the width of the slit 19a in those portions low, and to reduce the force required for expanding or contracting the inner diameter of the fitting support portion 31a. The shape of the tip-end surface of the convex sections 61a, 61b is not limited to being a flat surface as in the figures, and could also be an inclined surface or a convex circular arc surface.

With the telescopic steering apparatus of this example, even when an anti-theft key-lock system is assembled, sufficient strength of the outer column 11b is maintained, and it is possible to maintain smooth operation when making it possible to adjust the forward/backward position of the steering wheel 4 and when maintaining the adjusted position. First, the effect obtained by making the rigidity in the direction of expansion or contraction of the width of the slit 19a in the portion where the nearest end section 58a is formed higher than the rigidity in the direction of expansion or contraction of the width of the slit 19a in the portion where the remaining slit end section 58b is formed will be explained with reference to FIGS. 13A to 13C. The following rigidity and strength (1) and (2) of the fitting support portion 31a are important.

(1) Rigidity and Strength in the Torsional Direction

The rigidity and strength in the torsional direction is preferably as large as possible in order to prevent the occurrence of damage such as cracking to the fitting support portion 31a even when the steering wheel 4 is strongly rotated with the steering lock apparatus 32 (see FIG. 20) in operated state.

(2) Rigidity in the Direction for Separating or Bringing Together the Held Plate Sections 20a, 20b in Order to Expand or Contract the Inner Diameter:

The rigidity in the direction for separating or bringing together the held plate sections 20a, 20b is preferably set suitably low in order to allow smooth operation of the work for expanding or contracting the inner diameter of the fitting support portion 31a in order to switch between whether or not to enable adjustment of the forward/backward position of the steering wheel 4.

Figure 20:
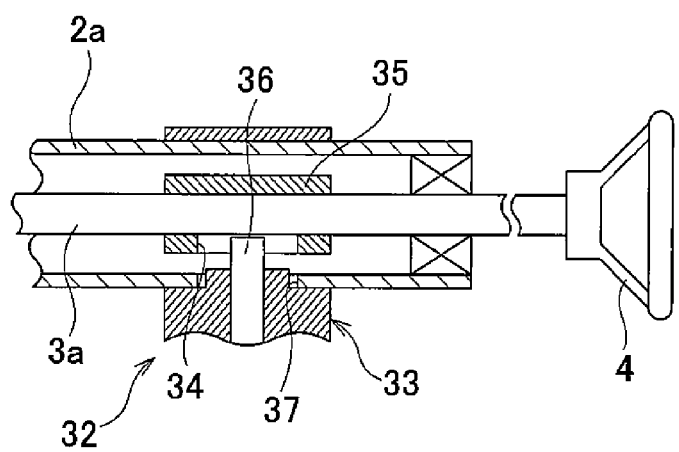
FIG. 20 is a partial cross-sectional view illustrating an example of a conventional steering apparatus in which a steering lock apparatus is assembled.
Figure 21:
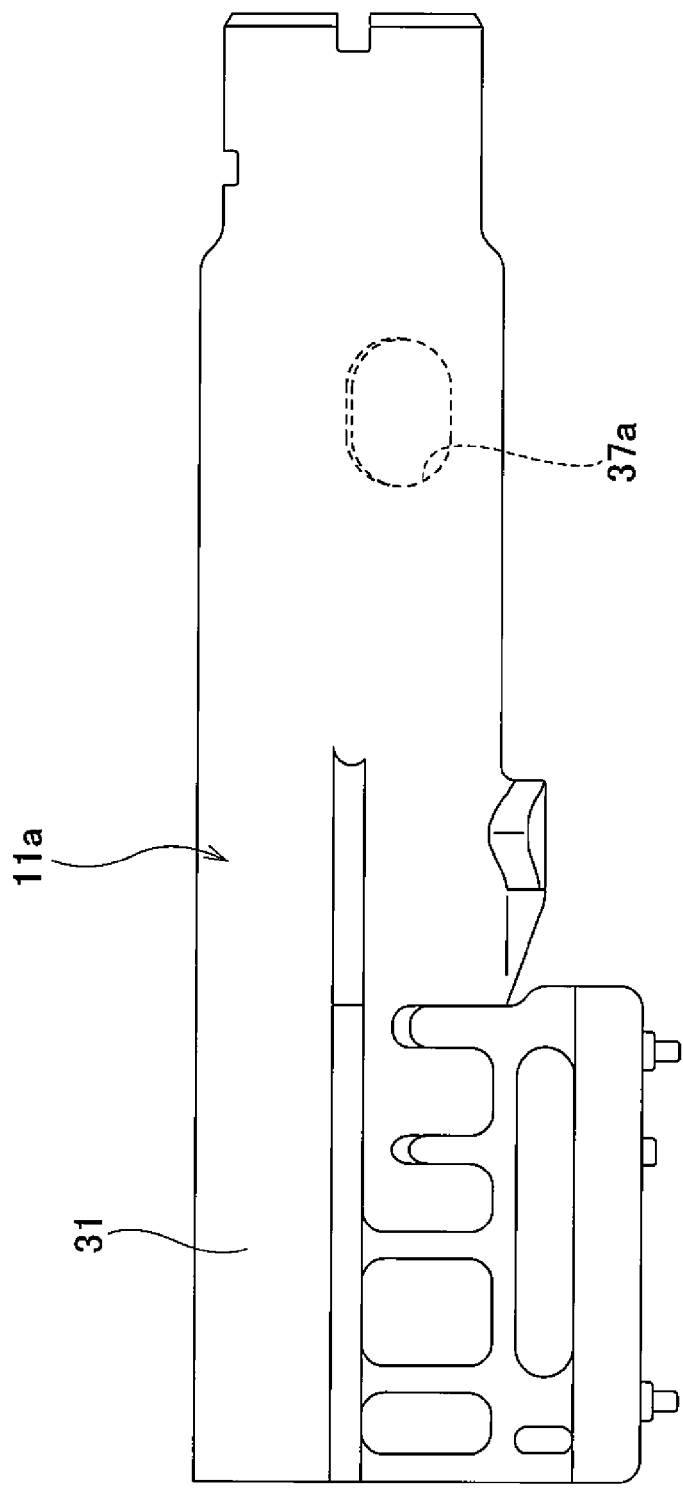
FIG. 21 is a side view illustrating an example of a conventional outer column that is made using a light metal alloy.

When the steering wheel 4 is strongly rotated with the steering lock apparatus 32 in the operated state, a large torque T is applied as illustrated by the bold arrow in FIG. 13C to the cylindrical shaped member 39 of the outer column 11b based on the engagement between the lock through hole 37b and the lock pin 36 (see FIG. 20). This torque T is transmitted to the fitting support portion 31a of the outer column 11b by way of the engagement between the cylindrical shaped member 39 and the main part 38a, however, when a large torque T is transmitted to the fitting support portion 31a in this way, large stress occurs in part of the slit 19a that is formed in the fitting support portion 31a. The size of the stress that occurs in this way becomes larger the closer the position is to the lock through hole 37b where the torque T is generated, or the lower the rigidity of that portion is. Therefore, when no countermeasure is performed, large stress occurs in the portion of the nearest end section 58a of the slit 19a that is formed in the fitting support portion 31a that is closest to the lock through hole 37b, and it becomes easy for damage such as cracking to occur.

In this example, a drop in the rigidity of the portion of the nearest end section 58a of the slit 19a is suppressed by suppressing the length in the circumferential direction of the portion of the nearest end section 58a. Moreover, the rigidity of the portion of the nearest end section 58a is increased by a reinforcing rib 60 that is provided in the portion adjacent to the nearest end section 58a. Therefore, in the portion of the fitting support portion 31a where the strength and rigidity are particularly required in relation to the operation of the steering lock apparatus 32, the strength and rigidity are sufficiently maintained. As a result, when the steering wheel 4 is strongly rotated with the steering lock apparatus 32 in the operated state, the occurrence of damage such as cracking of part of the slit 19a is suppressed regardless of large torsional stress that is applied to the fitting support portion 31a.

On the other hand, when the adjustment lever 30a is operated in order to main the forward/backward position of the steering wheel 4 in the adjusted position, a force in a direction that would bring the held plate sections toward each other as illustrated by the bold white arrows in FIG. 13A acts on the held plate sections 20a, 20b from the support plate sections 22a, 22b. In the case of the construction of the outer column 11b of this example, of the portion of the fitting support portion 31a where the held plate sections 20a, 20b are provided, the rigidity in the direction of expansion or contraction of the width of the slit 19a in the portions that correspond to the nearest end section 58a and the furthest end section 59a that are indicated by the bold wave shaped lines in FIG. 13A is high, however, the rigidity in the direction of expansion or contraction of the width of the slit 19a in the portions that correspond to the slit end sections 58b, 59b that are indicated by the thin wave shaped lines in FIG. 13A remains low. Therefore, it is possible to maintain a certain degree of flexibility of the fitting support portion 31a, so the amount of elastic deformation of the portions on the slit end section 58b, 59b side of the held plate sections 20a, 20b can be sufficiently maintained even without uselessly increasing the operating force that is applied to the adjustment lever 30a, and it is possible to bring the held plate sections 20a, 20b sufficiently close together.

Moreover, the held plate sections 20a, 20b elastically deform in the direction indicated in FIG. 13B due to a force applied in the direction of the bold white arrows by the operation of the adjustment lever 30a. In other words, with respect to the axial direction of the outer column 11b, the amount of elastic deformation on the slit end section 58b, 59b side is large, of which the rigidity in the direction of expansion or contraction of the width of the slit 19a is low, and the amount of elastic deformation on the nearest end section 58a and furthest end section 59a side becomes small, of which the rigidity in the direction of expansion or contraction of the width of the slit 19a is high, so the relationship of the size of the elastic deformation of the held plate sections 20a, 20b due to a force applied in the direction of the bold white arrows is opposite each other in the axial direction of the outer column 11b. Therefore, when the held plate sections 20a, 20b are elastically deformed due to a force acting in the direction of the bold white arrows, the length direction of the held plate sections 20a, 20b and the axial direction of the outer column 11b do not coincide, however, the held plate sections 20a, 20b are kept in a state parallel to each other. As a result, the surface pressure at the area of contact between the inner-circumferential surface of the fitting support portion 31a and the outer-circumferential surface of the inner column 10a can be made uniformly high along the entire length in the axial direction, so smooth operation of expanding or contracting the inner diameter of the outer column 11b can be maintained, and the clamping ability of the outer column 11b is good.

As described above, with the outer column 11b of this example, by joining the main part 38a made using a light metal alloy and the cylindrical shaped member 39 made using an iron-based material, it is possible to maintain the strength and rigidity of the outer column 11b while maintaining the flexibility thereof without increasing the axial dimensions of the main part 38a even when the layout space is restricted. Therefore, even when the steering wheel 4 is rotated with the steering lock apparatus 32 operated, it is possible to reduce the stress that occurs in the fitting support portion 31a, and keep the force that is required for expanding or contracting the inner diameter of the fitting support portion 31a small. As a result, in construction in which a steering lock apparatus 32 is provided, it is possible to maintain smooth operation of the work for expanding or contracting the inner diameter of the fitting support portion 31a in order to make it possible to adjust the forward/backward position of the steering wheel 4, and in order to maintain the forward/backward position in the adjusted position while sufficiently maintaining durability of the outer column 11b, so it is possible to improve the operational feeling of the adjustment lever 30a.

Moreover, as the rigidity of the rear-end section of the fitting support portion 31a is made higher on the nearest end section 58a side than on the remaining slit end section 58b side, the force required for operating the adjustment lever 30a when the adjustment rod 24a is located at the rear-end section of the long holes 21b, 21b in the forward/backward direction becomes greater than before the rigidity in the direction of expansion or contraction of the width of the slit 19a on the nearest end section 58a side is increased. However, the rigidity of the front-end section of the fitting support portion 31a is also higher on the furthest end section 59a side than on the remaining slit end section 59b side, so similarly, the force required to operate the adjustment lever 30a when the adjustment rod 24a is located on the front-end section of the long holes 21b, 21b in the forward/backward direction is increased.

In this example, convex sections 61a, 61b are provided at two locations on the outside surface of the held plate sections 20a, 20b that are separated in the up/down direction, so according to the operation of the adjustment lever 30a, the support plate sections 22a, 22b are able to stably press the held plate sections 20a, 20b from both sides in the width direction. In other words, when the adjustment lever 30a is rotated in a direction that produces that fastening force, the support plate sections 22a, 22b elastically deform in a direction such that the space between the inside surfaces of the support plate sections 22a, 22b becomes narrower in the downward direction. Therefore, in construction in which convex sections 61a, 61b are not provided, when the adjustment lever is rotated in a direction that produces a fastening force, the space between the inside surfaces that face each other of the pair of pressure sections in decreased, and the pair of support plate sections firmly press the pair of held plate sections, there is a possibility that the inside surfaces of the pair of support plate sections and the outside surfaces of the pair of held plate sections will come in contact at only one of the top or bottom section of the pair of held plate sections. In case that these surfaces only come in contact with the top section of the pair of held plate sections, the force for reducing the inner diameter of the fitting support portion increases. On the other hand, in case that these surfaces only come in contact with the bottom section of the pair of support plate sections, there is a possibility that the inner diameter of the fitting support portion will not be sufficiently reduced. However, in this example, the convex sections 61a, 61b that are provided on the top-end section and bottom-end section of the outside surfaces of the held plate sections 20a, 20b come in contact with the inside surfaces of the support plate sections 22a, 22b, so when the adjustment lever 30a is rotated in a direction that produces a fastening force, it is possible to sufficiently reduce the diameter of the fitting support portion 31a while keeping the force required for operating the adjustment lever 30a from increasing.

Moreover, reinforcing plates 50a, 50b are provided between one supporting plate section 22a of the supporting plate sections 22a, 22b and the installation plate section 49, so it is possible to increase the rigidity in the direction of rotation of the outer column 11b (steering column 2). Therefore, the steering column 2 is effectively prevented from rotating even when the steering wheel 4 is rotated when the steering lock apparatus 32 (see FIG. 20) has been operated. Furthermore, the support rigidity of the steering column 2 is also sufficiently maintained. In addition, in this example, the driven-side cam 28 of the cam apparatus 29 is engaged in the long hole 23a in the up/down direction that is formed in the one support plate section 22a having high rigidity. Therefore, when expanding or contracting the dimension in the axial direction of the cam apparatus 29, the one support plate section 22a is kept from elastically deforming in the width direction, and so it is possible to always maintain a suitable engaged state between the long hole 23a in the up/down direction and the driven-side cam 28.

A support section 62 that protrudes outward in the width direction is provided in the portion between the convex sections 61a, 61b that is near the front end of the outside surface of the one held plate section 20a, so even when the adjustment rod 24a is moved to the front-end section of the long holes 21b, 21b in the forward/backward direction, the force for reducing the inner diameter of the fitting support portion 31a is prevented from dropping. In other words, when the adjustment lever 30 is rotated in the direction to produce a fastening force, the other support plate section 22b having comparatively low rigidity tends to elastically deform into a V shape as illustrated in the right half of FIG. 14 with the engaging section with the adjustment rod 24a as the center regardless of the forward/backward position of the adjustment rod 24a. On the other hand, when the adjustment rod 24a is located at the front-end section of the long holes 21b, 21b in the forward/backward direction as illustrated in FIG. 15A, the one support plate section 22a having comparatively high rigidity hardly deforms (bends) elastically at all due to the existence of the support section 62, however, as illustrated in FIG. 15B and FIG. 15C, when the adjustment rod 24a is located in a position from the middle section to the rear-end section, there is a tendency for the one support plate section 22a to elastically deform, and the amount of that bending becomes larger going toward the rear-end side. In regards to this, the rigidity in the direction of expansion or contraction of the width of the slit 19a in the portion where the furthest end section 59a is formed becomes comparatively high. Therefore, in a state in which the adjustment rod 24a has moved to the portion near the front end of the long holes 21b, 21b in forward/backward direction, when a support section 62 is not provided, there is a possibility that the one support plate section 22a will elastically deform into a V shape, and that the force for reducing the inner diameter of the fitting support portion 31a will drop. That is, the fastening force generated by the operation of the adjustment lever 30a is consumed in order to bend and deform the one support plate section 22a into a V shape, so the force for reducing the inner diameter of the fitting support portion 31a is weakened by that amount. However, in this example, the support section 62 suppresses elastic deformation of the one support plate section 22a, so it is possible to prevent a drop in the force for reducing the inner diameter of the fitting support portion 31a. Therefore, it is possible to stabilize the operational feeling of the adjustment lever 30a along the forward/backward direction of the steering wheel 4.

Furthermore, an inclined surface 63 is provided on the rear-end section of the support section 62 so that the height of the support section 62 becomes smaller going toward the rear. Therefore, as illustrated in FIG. 15A to FIG. 15C, by providing an inclined surface 63, as the adjustment rod 24a is moved toward the rear of the long holes 21b, 21b in the forward/ backward direction, the force that acts in the direction that causes the one support plate section 22a that is supported by the support section 62 to elastically deform into a V shape can be gradually released. As a result, a sudden change in the force required for operating the adjustment lever 30a as the adjustment rod 24a displaces in the forward/backward direction is prevented. Moreover, by providing a support section 62, a decrease in the operability of the telescopic position adjustment is also prevented.

Second Example

Figure 1:
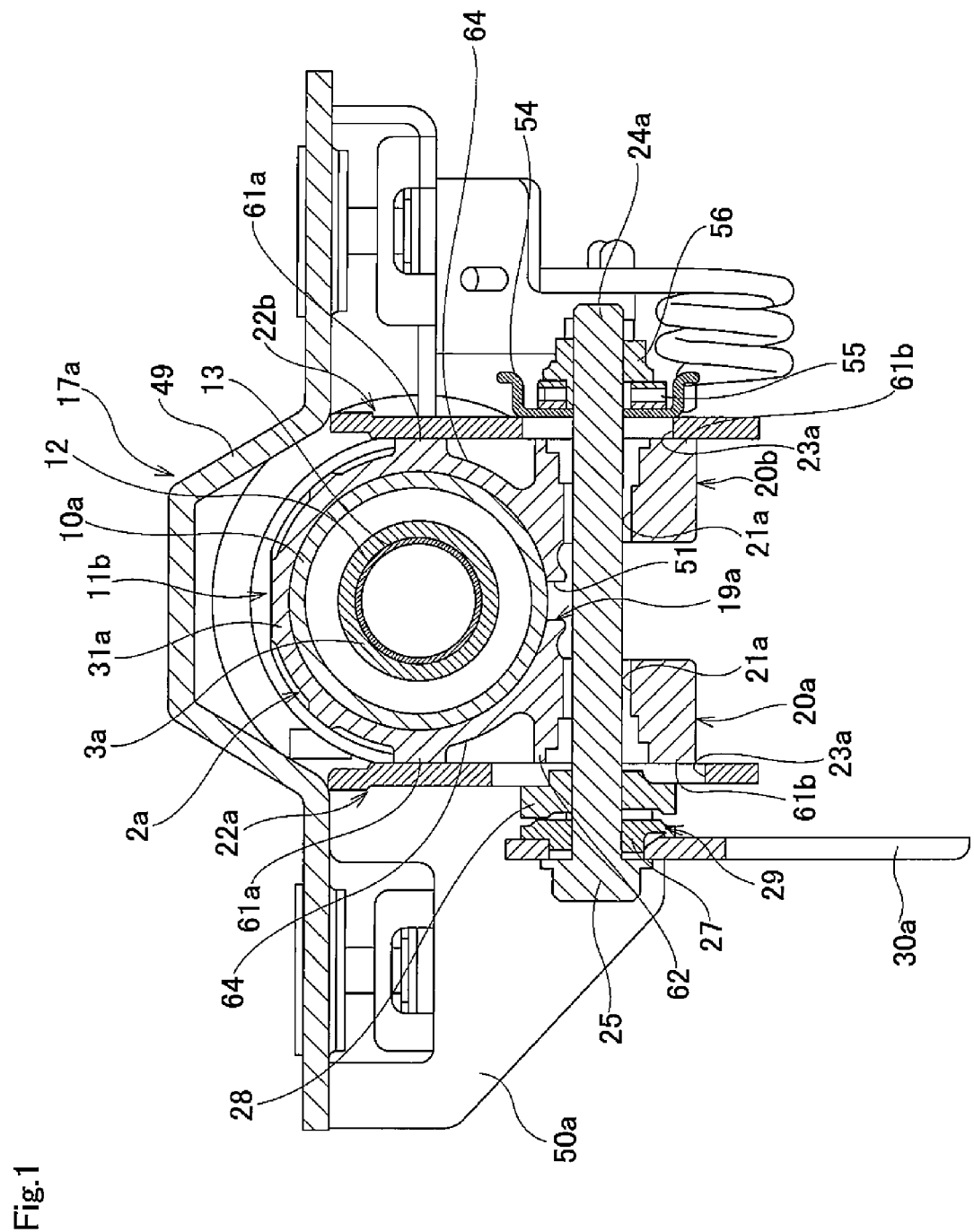
FIG. 1 is a cross-sectional view of a first example of an embodiment of the present invention.
Figure 2:
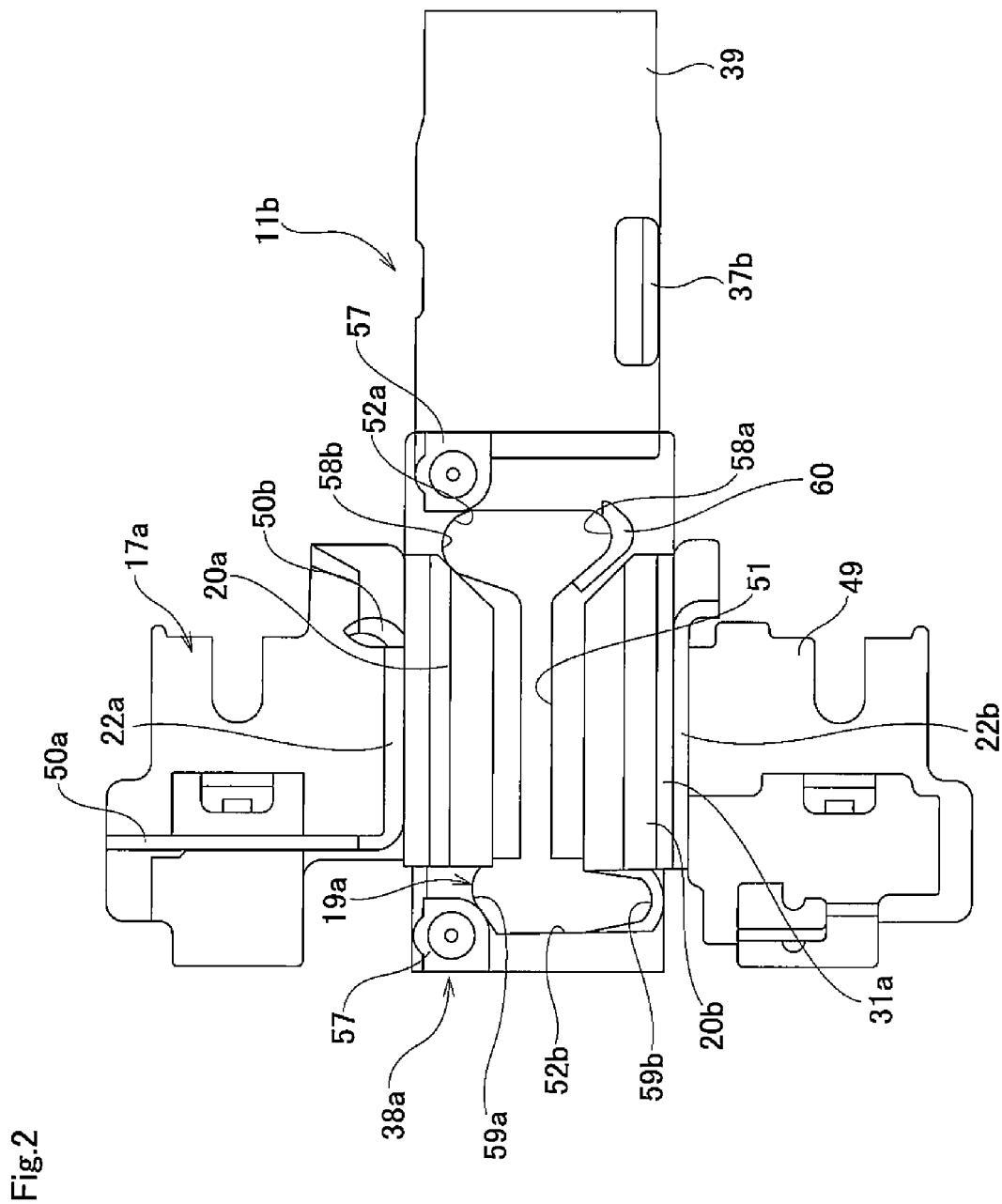
FIG. 2 is a bottom view of the outer column and support bracket of the first example that have been removed as seen from below.
Figure 3:
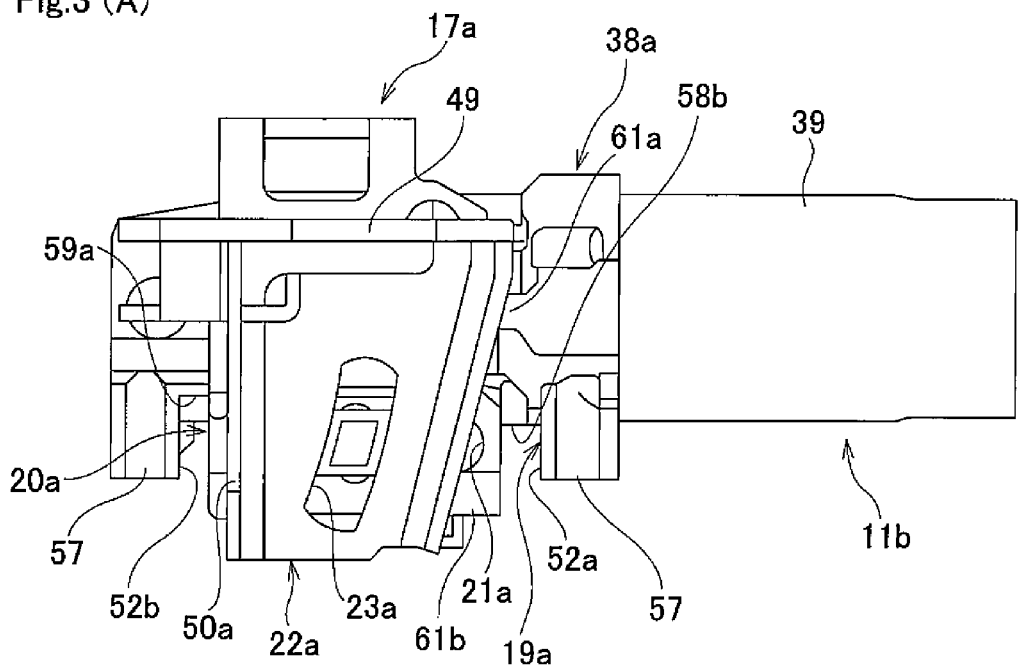
FIG. 3A is one side view of the outer column and support bracket shown in FIG. 2.
FIG. 3B is another side view thereof.
Figure 3:
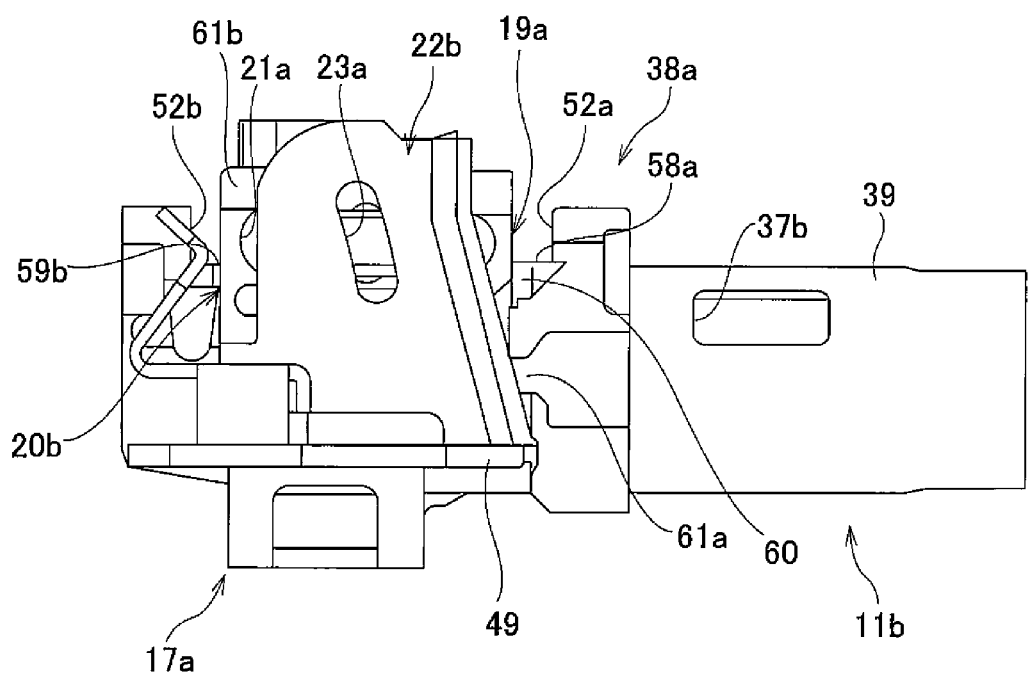
Figure 4:
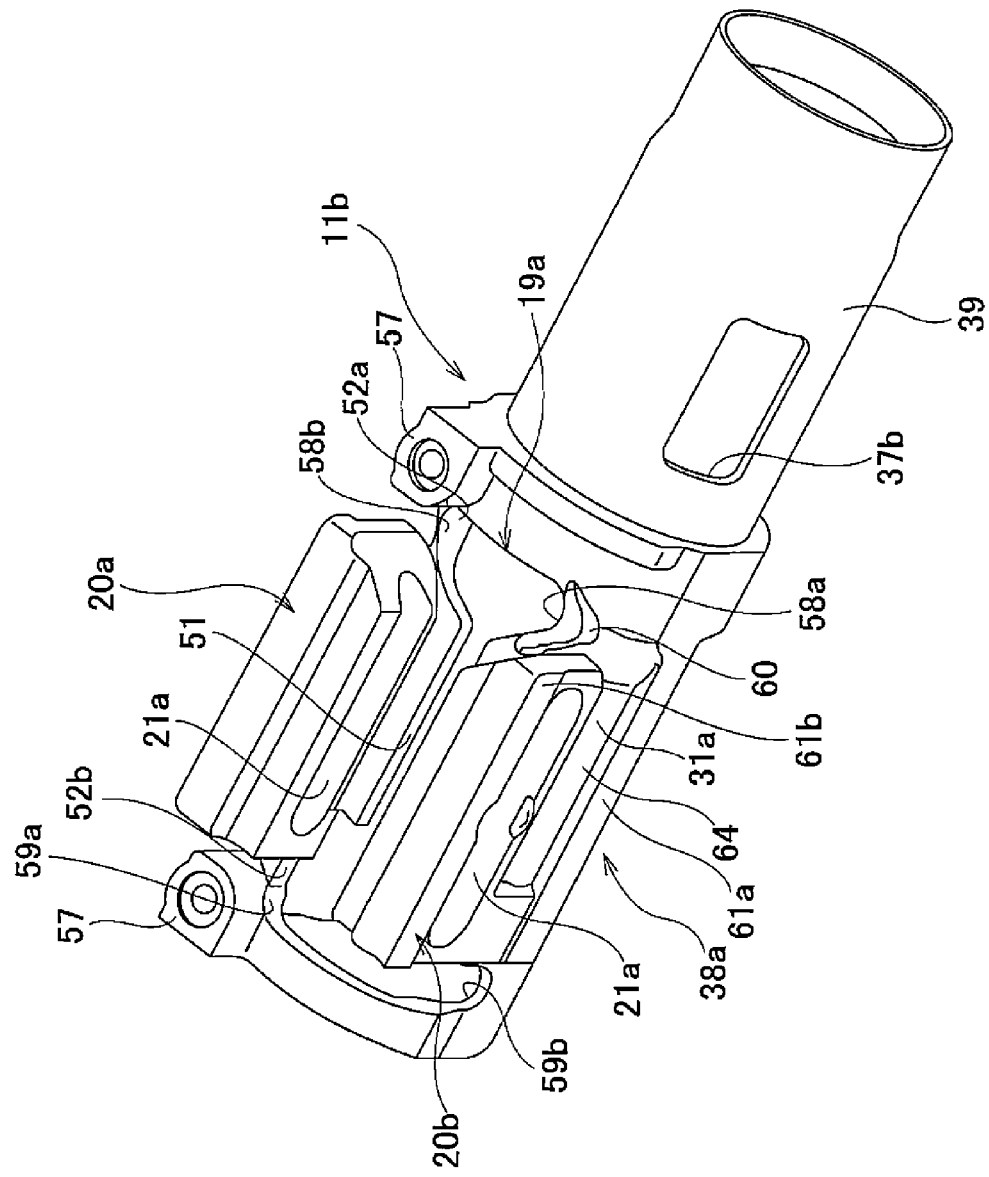
FIG. 4 is a perspective view of the outer column of the first example as seen from a diagonal direction below.
Figure 5:
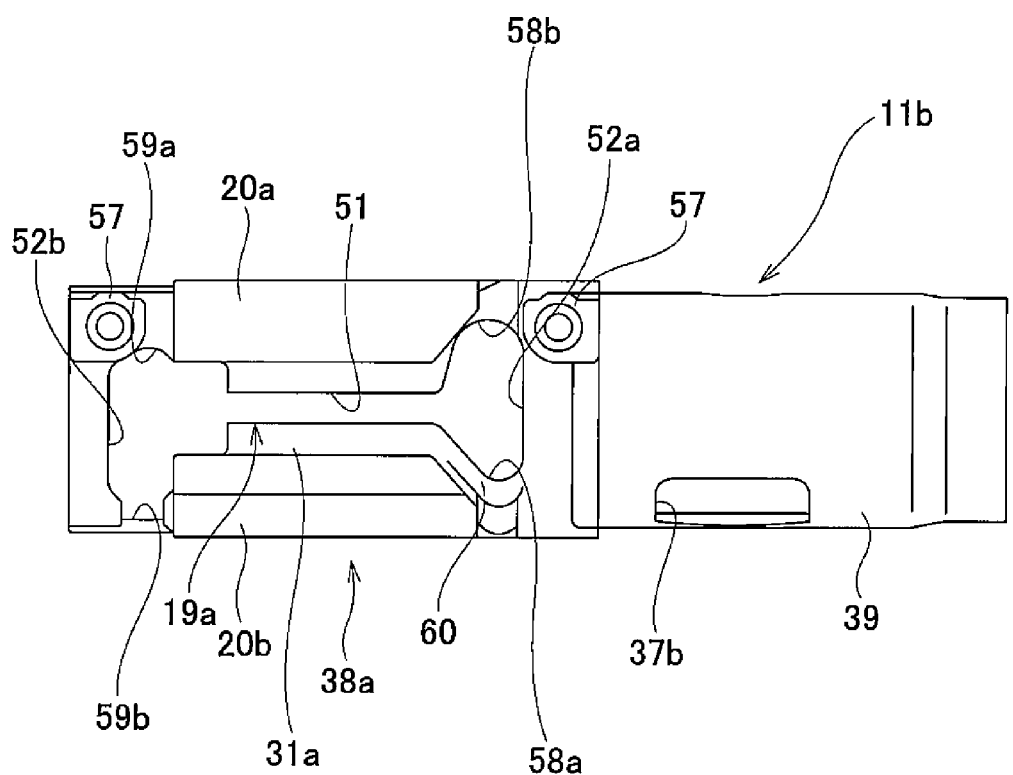
FIG. 5 is an orthographic projection of the outer column of the first example that has been removed as seen from below.
Figure 6:
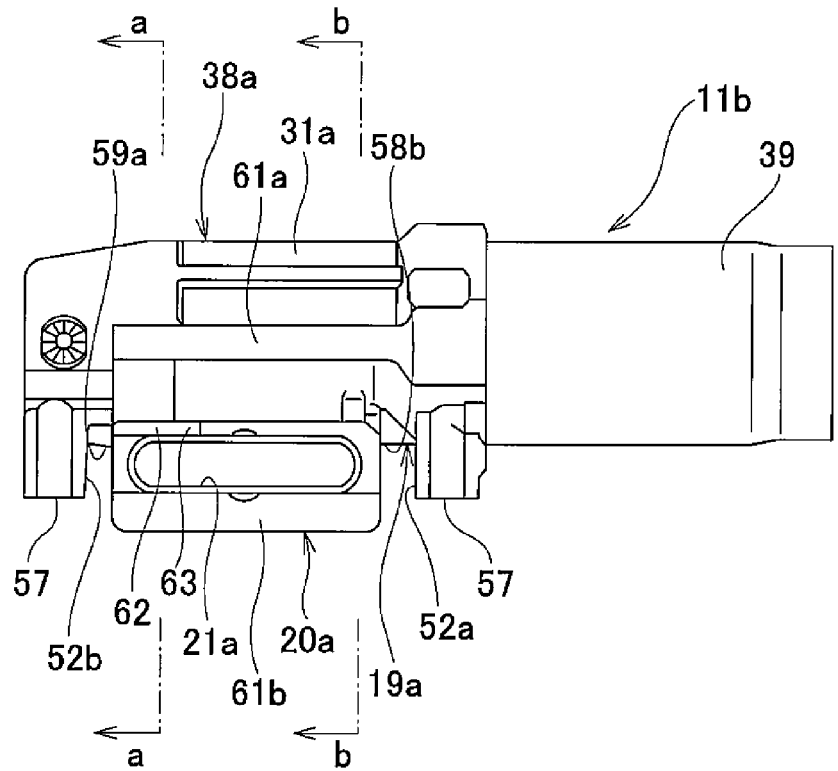
FIG. 6A is one side view of the outer column shown in FIG. 5.
FIG. 6B is another side view thereof.
Figure 6:
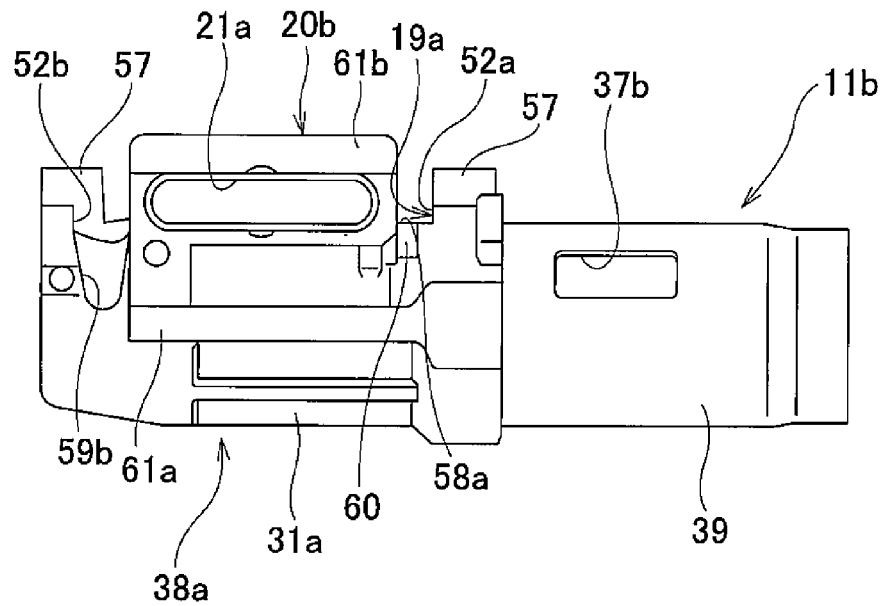
Figure 7:
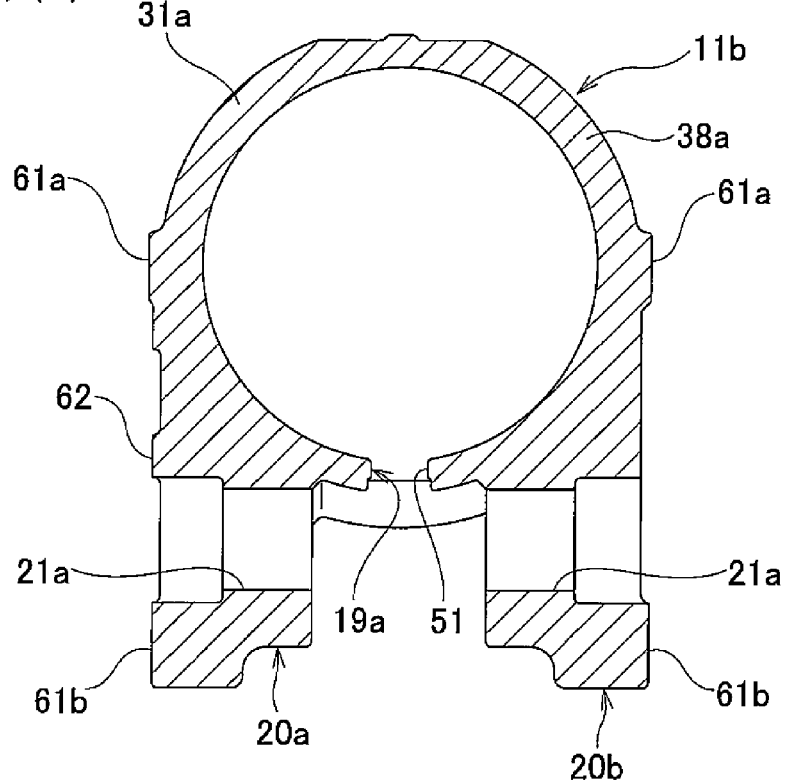
FIG. 7A is a cross-sectional view of section a-a in FIG. 6A.
FIG. 7B is a cross-sectional view of section b-b in FIG. 6A.
Figure 7:
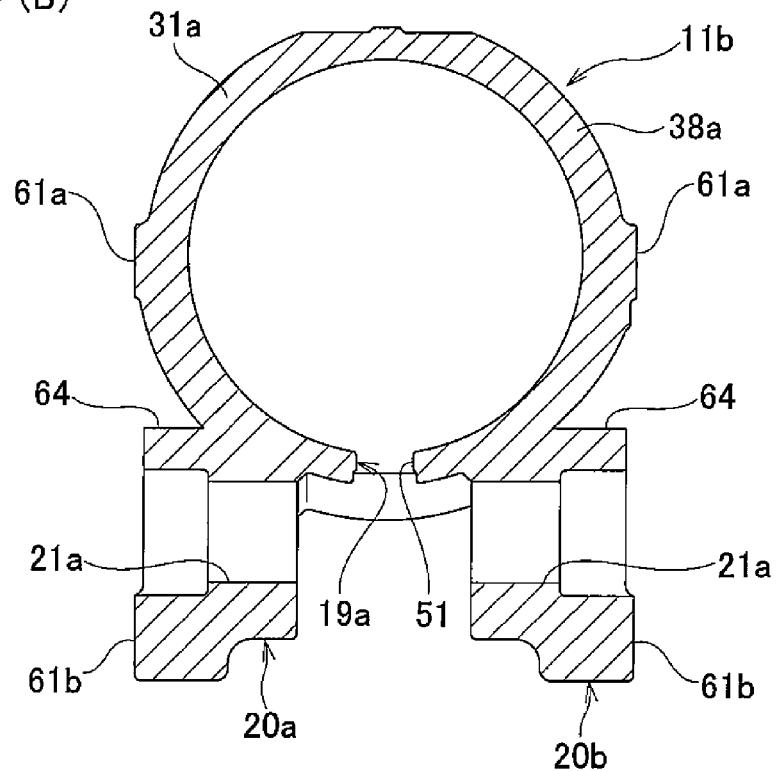
Figure 8:
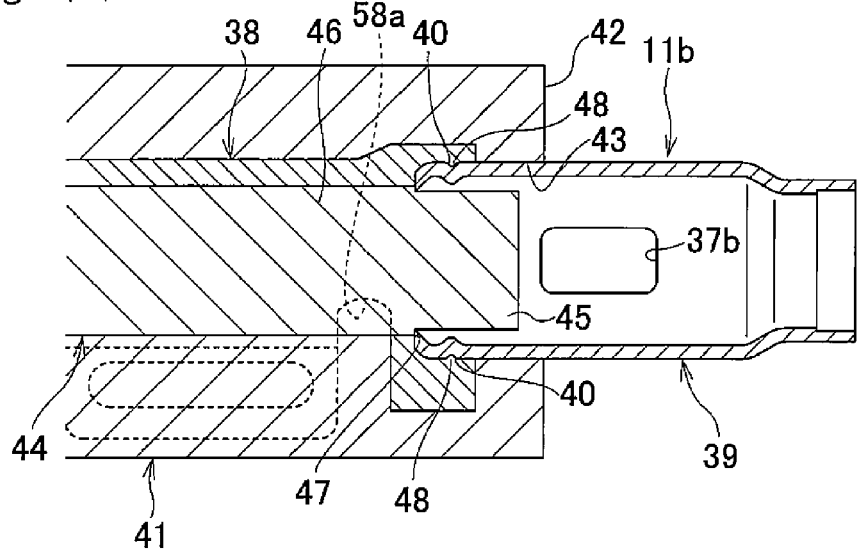
FIG. 8A to FIG. 8C are cross-sectional views illustrating a method for manufacturing the outer column of the first example in order of steps.
Figure 8:
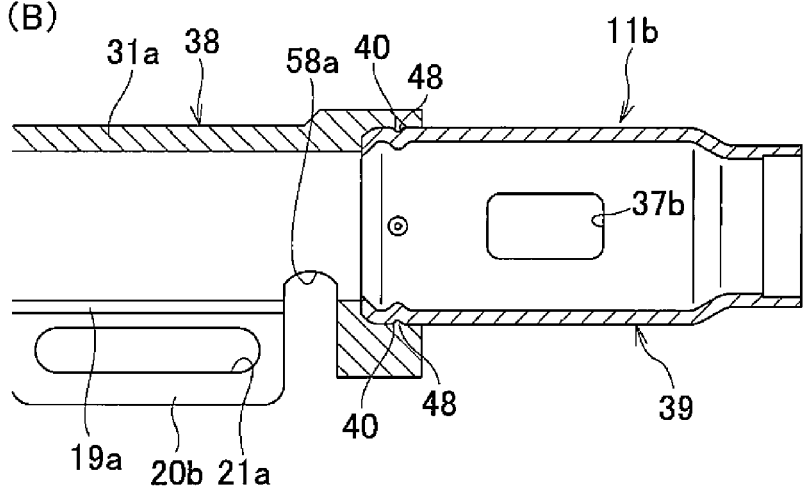
Figure 8:
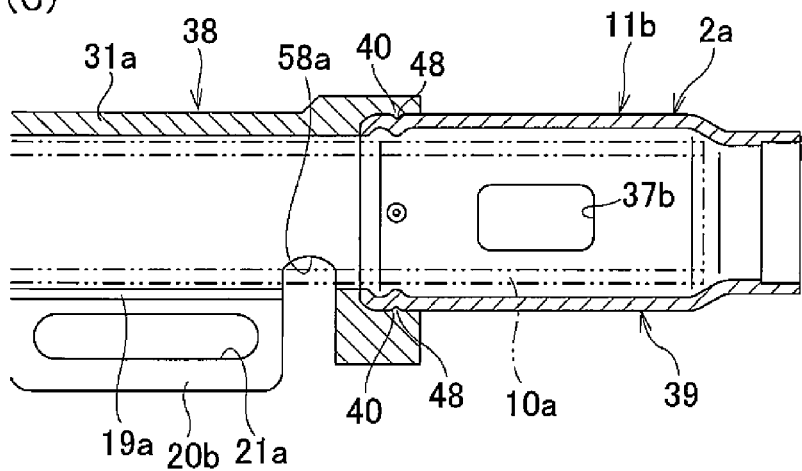
Figure 9:
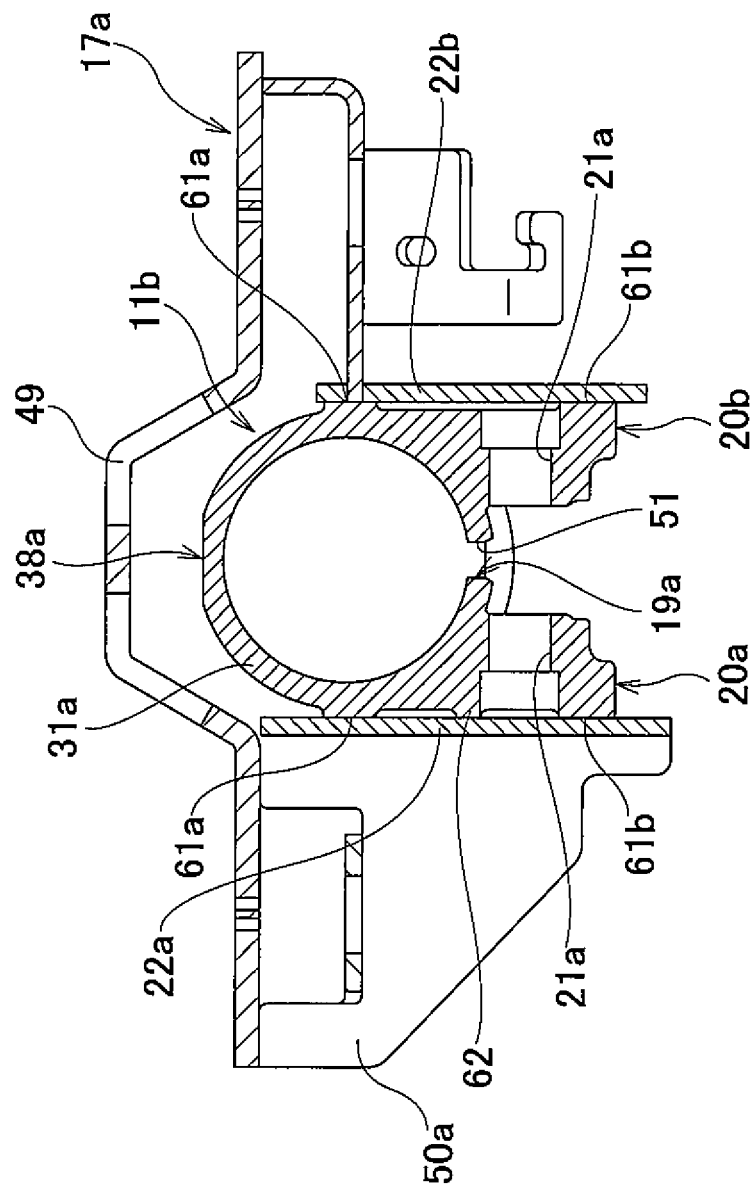
FIG. 9 is a cross-sectional view illustrating the support bracket and outer column of the first example that have been removed.
Figure 10:
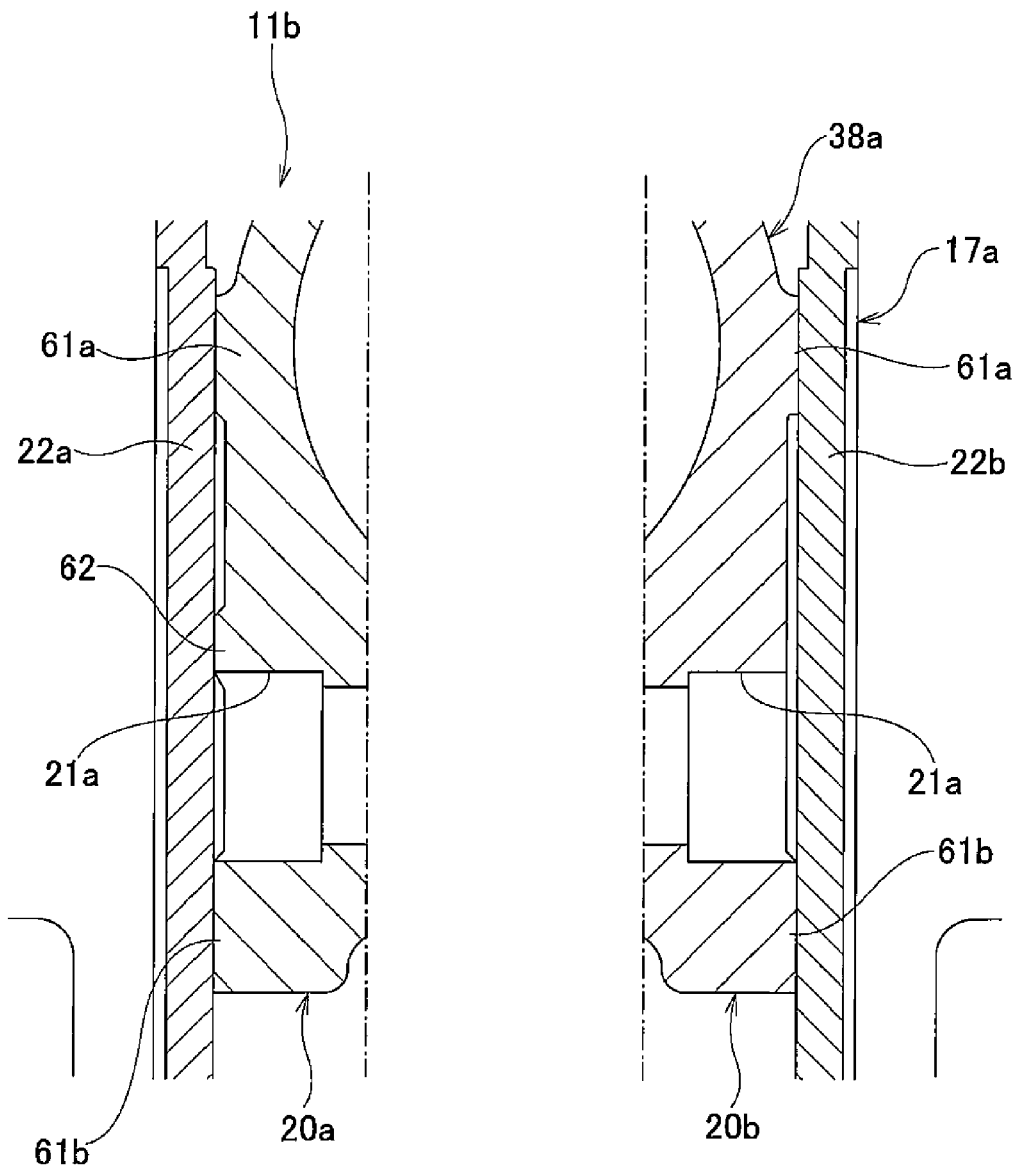
FIG. 10 is a partial enlarged cross-sectional view illustrating the area of contact between the inside surfaces of the support plate sections and outside surfaces of convex sections of the first example.
Figure 11:
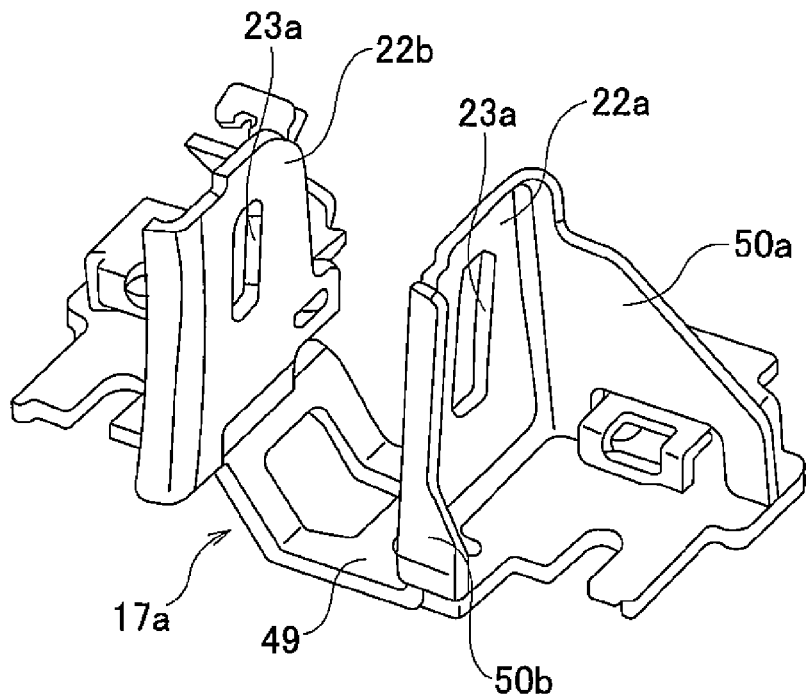
FIG. 11 is a perspective view of the support bracket of the first example that has been removed and as seen from a diagonal direction below.
Figure 12:
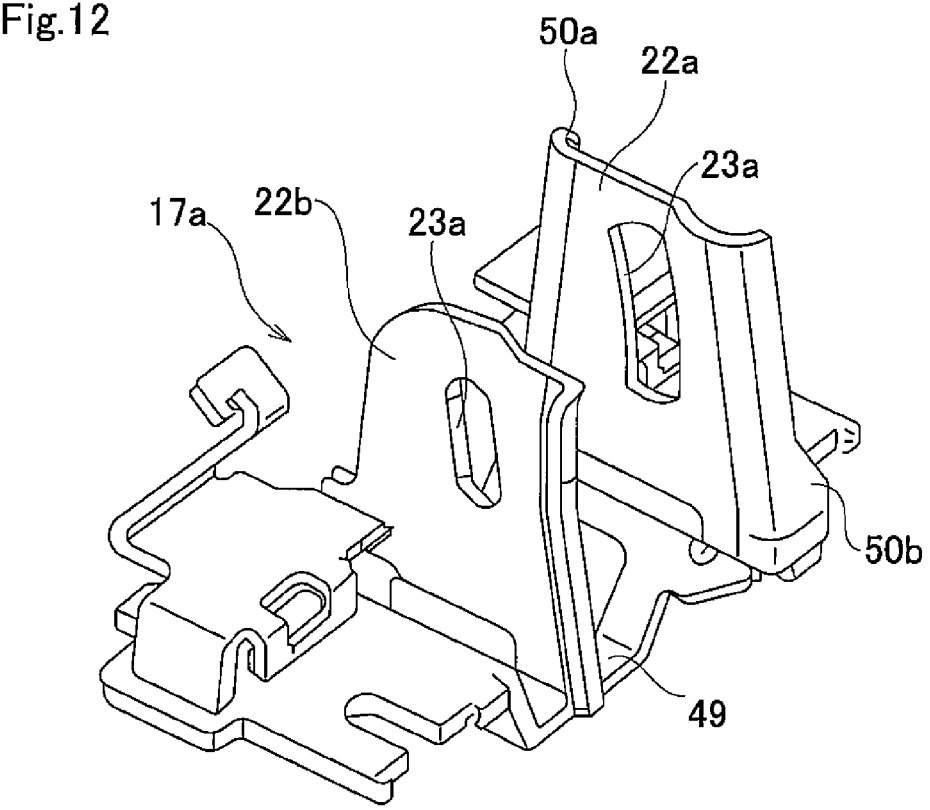
FIG. 12 is a perspective view of the support bracket of the first example that has been removed as seen from the opposite direction in the width direction of that in FIG. 11.
Figure 13:
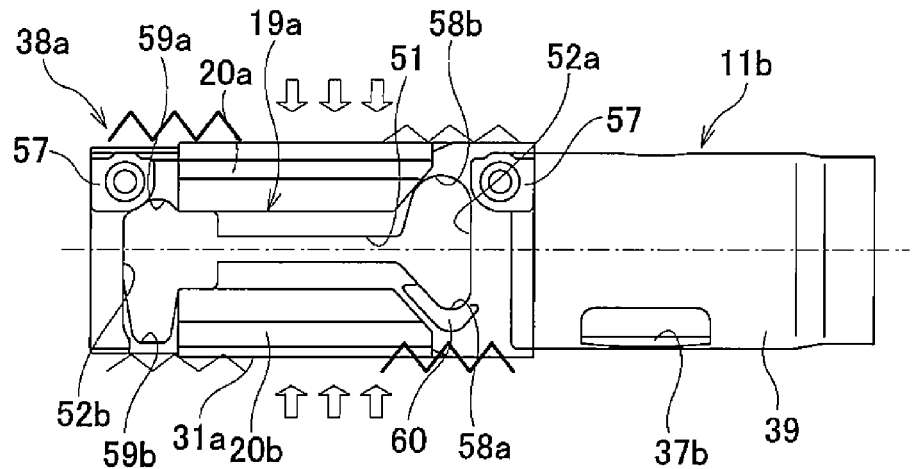
FIG. 13A to FIG. 13C are views similar to FIG. 5 and are for explaining the state of the force applied to each part in the first example.
Figure 13:
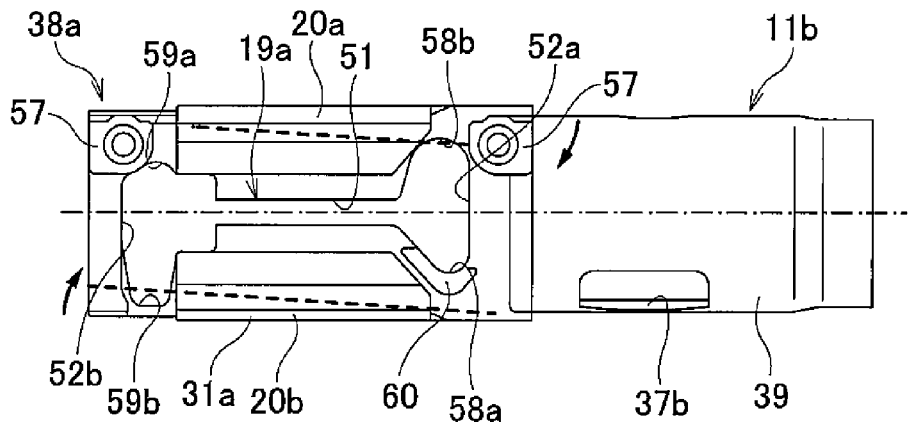
Figure 13:
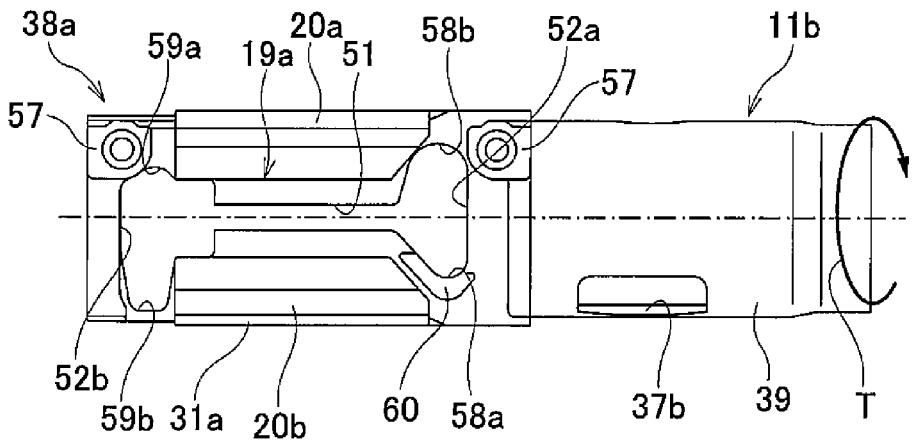
Figure 14:
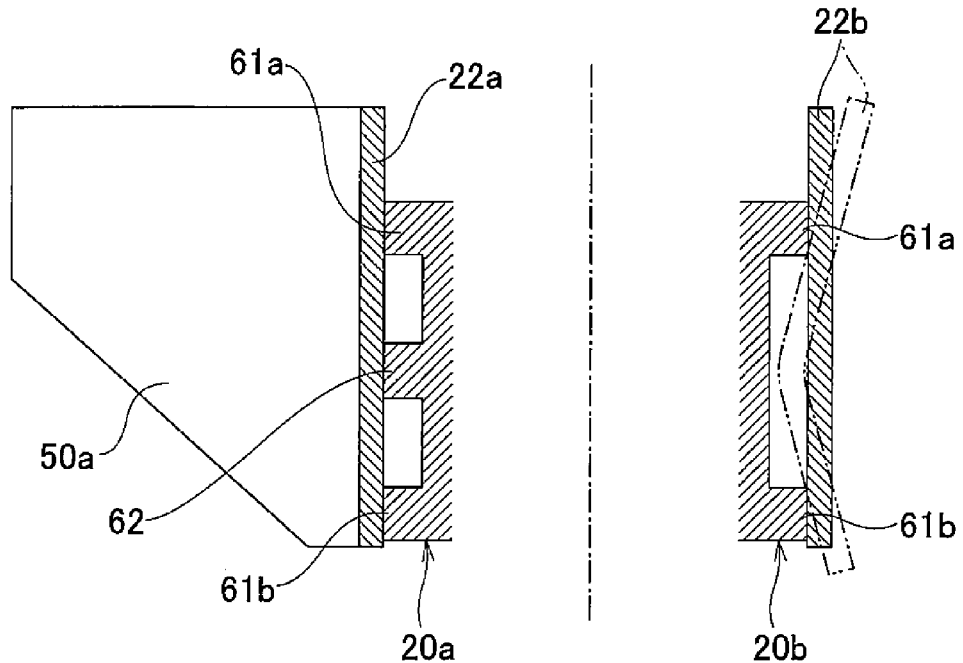
FIG. 14 is a schematic drawing for explaining the effect of providing a support section in the first example.
Figure 15:
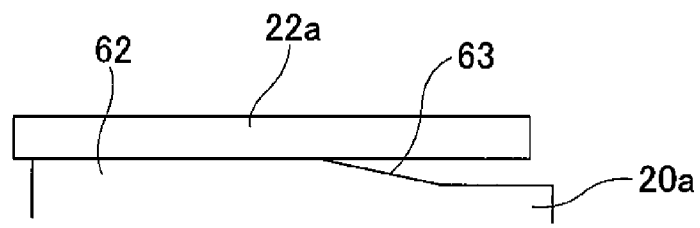
FIG. 15A to FIG. 15C are schematic drawings for illustrating the effect of providing an inclined surface in the first example.
Figure 15:
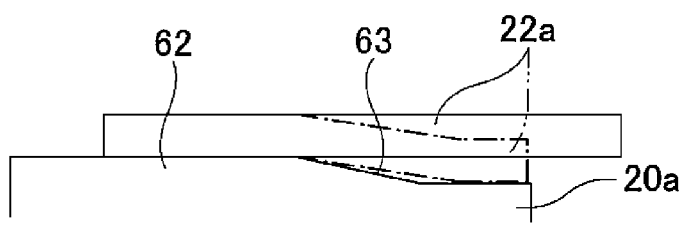
Figure 15:
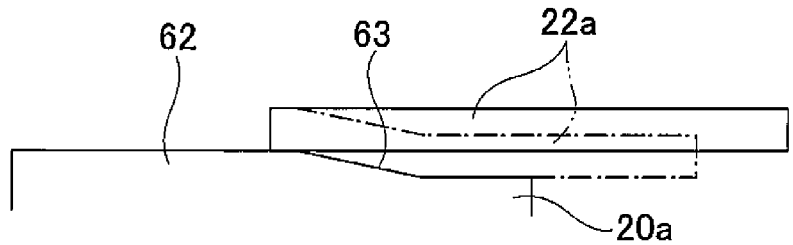
Figure 16:
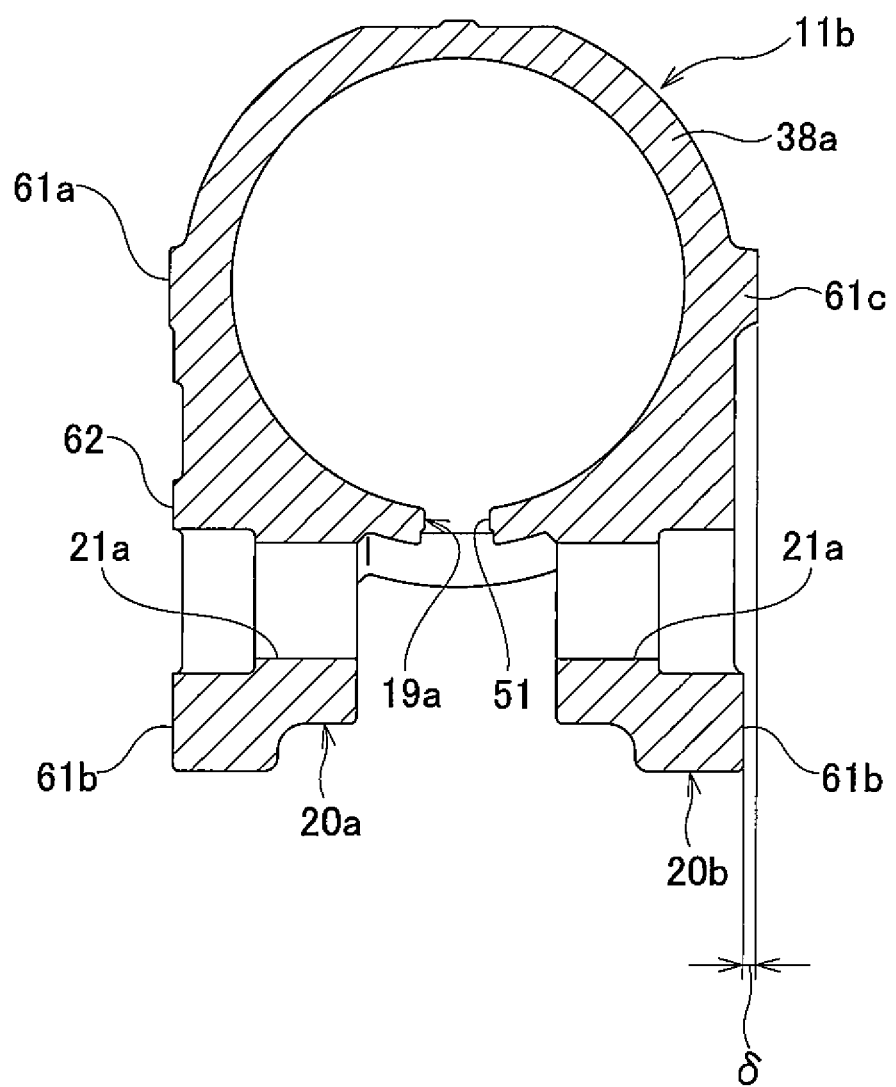
FIG. 16 is a view that corresponds to FIG. 7A, and illustrates a second example of an embodiment of the present invention.
Figure 17:
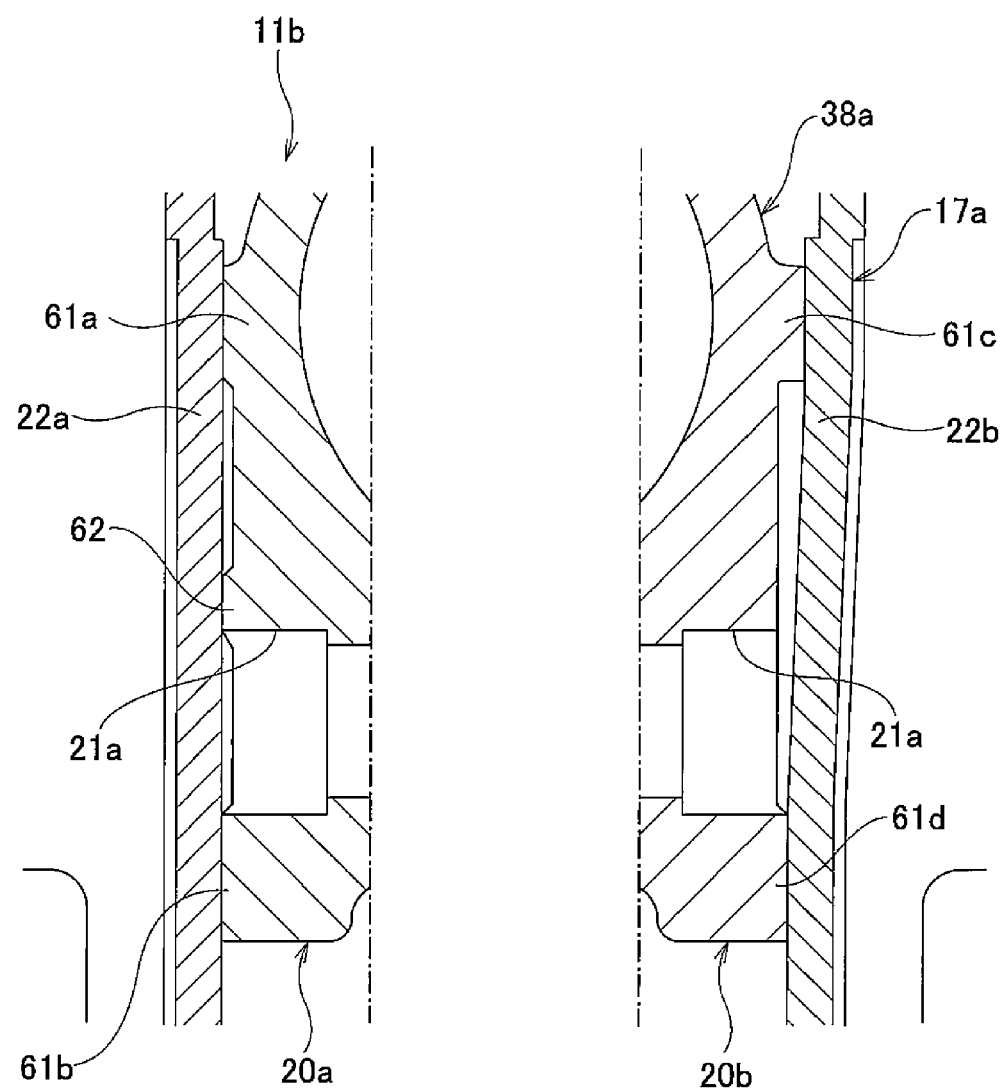
FIG. 17 is a view that corresponds to FIG. 10 in the case of the second example.

FIG. 16 and FIG. 17 illustrate a second example of an embodiment of the present invention. In the first example of an embodiment, the amount of protrusion from the outside surface of the held plate section 20b of the pair of convex sections 61a, 61b with respect to the other held plate section 20b of the pair of held plate section 20a, 20b that faces the support plate section 22b having low rigidity as well is the same. However, in this example, of the pair of convex sections 61c, 61d that are formed on the outside surface of the held plate section 20b, the convex section 61c on the top-end section is made to protrude a much larger amount toward the outside in the width direction than the convex section 61d on the bottom-end section, and that convex section 61c protrudes more from the outside surface of the held plate section 20b by an amount δ. More specifically, the convex section 61c on the top-end side is made to protrude outward in the width direction more than the convex section 61d on the bottom-end section by an amount δ=0.2 mm to 0.4 mm.

In this example, when compared with the first example of an embodiment, it is possible to maintain a large amount of bending (amount of elastic deformation) of the portion on the bottom-end side of the support plate section 22b for which the rigidity is set to be low, and it is possible to make more sure contact between the inside surface of the support plate section 22b and the tip-end surfaces of the convex sections 61c, 61d. In other words, it is possible to achieve more certain two-point contact construction. Therefore, it is possible to stabilize the force by which the fitting support portion 31a supports the end section of the inner column 10a (see FIG. 1). The construction, functions and effects of the other construction of this example are the same as in the case of the first example of an embodiment.

INDUSTRIAL APPLICABILITY

The present invention can be widely applied to telescopic steering apparatuses that comprise a telescopic mechanism for adjusting the forward/backward position of a steering wheel regardless of whether or not a tilt mechanism is installed.

EXPLANATION OF REFERENCE NUMBERS

1 Vehicle body
2, 2a Steering column
3, 3a Steering shaft
4 Steering wheel
5a, 5b Universal joint
6 Intermediate shaft
7 Steering gear unit
8 Input shaft
9 Tie rod
10, 10a Inner column
11, 11a, 11b Outer column
12 Outer tube
13 Inner shaft
14 Electric motor
15 Housing
16 Horizontal shaft
17, 17a Support bracket
19, 19a Slit
20, 20a, 20b Held plate section
21, 21a Long hole in the forward/backward direction
22, 22a, 22a Support plate section
23, 23a Long hole in the up/down direction
24, 24a Adjustment rod
25 Head section
26 Nut
27 Drive-side cam
28 Driven-side cam
29 Cam apparatus
30 Adjustment lever
31, 31a Fitting support portion
32 Steering lock apparatus
33 Lock unit
34 Engaging concave section
35 Key-lock collar
36 Lock pin
37, 37a, 37b Lock through hole
38, 38a Main part
39 Cylindrical shaped member
40 Concave section
41 Die
42 End surface
43 Insertion hole
44 Core
45 Tip-end section
46 Base-end section
47 Stepped surface
48 Convex section
49 Installation plate section
50a, 50b Reinforcing plate
51 Main slit section
52a, 52b Sub slit section
53 Thrust bearing
54 Washer
55 Thrust bearing
56 Nut
57 Installation section
58a, 58b Slit end section (58a Nearest end section)
59a, 59b Slit end section (59a Furthest end section)
60 Reinforcing rib
61a to 61d Convex section
62 Support section
63 Inclined surface
64 Section with material removed

What is claimed is:
1. An outer column for a telescopic steering apparatus, comprising:
a slit formed in one end section in an axial direction of the outer column;
a pair of held plate sections provided at positions on both sides of the slit in a width direction of the outer column, and provided with long holes that extend in the axial direction and are formed in portions that are aligned with each other; and
a lock through hole formed in a portion that is separated in the axial direction from the pair of held plate sections, with a phase of the portion in a circumferential direction of the outer column being shifted from a center axis of the slit, the slit having an approximately H shape as seen from a radial direction of the outer column, and comprising: a main slit section formed in the axial direction; and a pair of sub slit sections formed in the circumferential direction on both end sections in the axial direction of the main slit section, with middle sections in the circumferential direction of the sub slit sections being continuous with the end sections in the axial direction of the main slit section, lengths in the circumferential direction from the main slit section, of a nearest end section that is one of two end sections of one sub slit section of the pair of sub slit sections on a side nearer in the axial direction to the lock through hole and that exists in a position in the circumferential direction near the lock through hole, and of a furthest end section that is one of two end sections of another sub slit section on a side farther in the axial direction from the lock through hole and that exists in a position located diagonally from the nearest end section and that is separated most from the lock through hole, being shorter than lengths in the circumferential direction from the main slit section, of another end section of the one sub slit section, and of another end section of the other sub slit section, and rigidities in a direction of expansion or contraction of a width of the slit of portions where the nearest end section and the furthest end section are formed being greater than rigidities in the direction of expansion or contraction of the width of the slit of portions where the other end section of the one sub slit section and the other end section of the other sub slit section are formed, and convex sections protruding outward in the width direction and extending in the axial direction being provided at two locations on outside surfaces of the pair of held plate sections that are separated in an up/down direction of the outer column, and a support section protruding outward in the width direction being provided in a portion between the convex sections in the up/down direction of an end section on the side farther in the axial direction from the lock through hole of one of the outside surfaces of the pair of held plate sections that is on a side farther in the circumferential direction from the lock through hole.

2. The outer column for a telescopic steering apparatus according to claim 1, wherein the convex sections are provided on a top-end section and a bottom-end section of each of the pair of held plate sections.

3. The outer column for a telescopic steering apparatus according to claim 1, wherein an inclined surface is provided on at least an end section of the support section on the side nearer in the axial direction to the lock through hole so that the height of the support section gradually becomes lower going in the axial direction toward the lock through hole.

4. The outer column for a telescopic steering apparatus according to claim 1, wherein in one of the outside surfaces of the pair of held plate sections that is on a side nearer in the circumferential direction to the lock through hole, one of the convex sections that is provided on a top side protrudes further outward in the width direction than other of the convex sections that is provided on a bottom side.

5. The outer column for a telescopic steering apparatus according to claim 1, wherein a reinforcing rib is provided on an outer-circumferential surface of a portion that surrounds the nearest end section.

6. The outer column for a telescopic steering apparatus according to claim 1, the outer column being constructed by joining: a main part made of a light metal alloy and having an end section; and a cylindrical shaped member made of an iron-based material and having a middle section in the axial direction and an end section, an inner diameter dimension of the end section of the cylindrical shaped member being smaller than that of the middle section in the axial direction, in the axial direction by fitting and fastening the end section of the cylindrical shaped member inside the end section of the main part, wherein the slit and the pair of held plate sections are provided on the main part, and the lock through hole is provided on the cylindrical shaped member.

7. A telescopic steering apparatus, comprising:
a steering column having an inner column and an outer column that is fitted onto the inner column, the outer column being constructed by the outer column described in claim 1, with a diameter of one end section of the outer column being able to expand or contract by way of the slit;
a steering shaft constructed by combining together an outer tube and an inner shaft so that an entire length of the steering shaft is able to extend or contract, the steering shaft being rotatably supported on an inner-diameter side of the steering column;
a support bracket having a pair of support plate sections that hold the pair of held plate sections from both sides in the width direction, and an installation plate section that supports the pair of support plate sections with respect to a vehicle body;
bracket-side through holes formed in portions of the pair of support plate sections that are aligned with the long holes that are formed in the pair of held plate sections;
a rod shaped member inserted though the long holes and the bracket-side through holes; and
adjustment means for expanding or contracting a space between a pair of pressure sections that are provided on both end sections of the rod shaped member by operation of an adjustment lever that is provided on one of the end sections of the rod shaped member, so that when contracting the space, a forward/backward position of the outer column with respect to the inner column is secured by reducing the space between inside surfaces of the pair of support plate sections, and causing friction engagement between the inside surfaces of the pair of support plate sections and the outside surfaces of the pair of held plate sections.

8. The telescopic steering apparatus according to claim 7, wherein a support rigidity with respect to the installation plate section of one support plate section of the pair of support plate sections that is on a side farther in the width direction from the lock through hole is higher than a support rigidity with respect to the installation section of another support plate section.

9. The telescopic steering apparatus according to claim 7, wherein a reinforcing rib is provided between the one support plate section of the pair of support plate sections that is on a side farther in the width direction from the lock through hole and the installation plate section.

* * * * *